(12) United States Patent
Jeon et al.

(10) Patent No.: US 10,840,983 B2
(45) Date of Patent: Nov. 17, 2020

(54) APPARATUS AND METHOD FOR INTEGRATED BEAMFORMING IN WIRELESS COMMUNICATION SYSTEM

(71) Applicants:Samsung Electronics Co., Ltd., Suwon-si (KR); POSTECH ACADEMY-INDUSTRY FOUNDATION, Pohang-si (KR)

(72) Inventors: Younghyun Jeon, Suwon-si (KR); Namyoon Lee, Pohang-si (KR); Eunyong Kim, Suwon-si (KR); Chulhee Jang, Suwon-si (KR); Jiwook Choi, Pohang-si (KR); Yunseo Nam, Pohang-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 16/441,990

(22) Filed: Jun. 14, 2019

(65) Prior Publication Data

US 2019/0386727 A1    Dec. 19, 2019

(30) Foreign Application Priority Data

Jun. 15, 2018   (KR) ................. 10-2018-0069295

(51) Int. Cl.
*H04B 7/06* (2006.01)
*H04L 25/02* (2006.01)
(Continued)

(52) U.S. Cl.
CPC ....... *H04B 7/0617* (2013.01); *H04L 25/0204* (2013.01); *H04W 84/042* (2013.01); *H04W 88/08* (2013.01)

(58) Field of Classification Search
CPC ............ H04B 7/0617; H04L 25/0204; H04W 84/042; H04W 88/08
See application file for complete search history.

(56) References Cited

U.S. PATENT DOCUMENTS

| | | | |
|---|---|---|---|
| 8,818,440 B2* | 8/2014 | Ko ....................... | H04B 7/0617 455/13.4 |
| 8,934,557 B2* | 1/2015 | Cavalcante ............ | H04B 7/024 370/252 |

(Continued)

FOREIGN PATENT DOCUMENTS

| | | |
|---|---|---|
| WO | 2016/013882 A1 | 1/2016 |
| WO | 2018/033207 A1 | 2/2018 |

OTHER PUBLICATIONS

Jinwook Choi et al., "Joint User Scheduling, Power Allocation, and Precoding Design for Massive MIMO Systems: A Principal Component Analysis Approach", Jun. 2018, https://ieeexplore.ieee.org/abstract/document/8437617.

(Continued)

*Primary Examiner* — Sophia Vlahos
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system such as long term evolution (LTE). An operating method of a base station in a wireless communication system is provided. The operating method includes estimating a channel for each of a plurality of terminals based on reference signals received from the plurality of the terminals, determining a beamforming vector matrix for each of the plurality of the terminals by considering scheduling and power allocation information based on the estimated channels, and (Continued)

transmitting data to at least one of the plurality of the terminals using the determined beamforming vector matrix.

13 Claims, 28 Drawing Sheets

(51) Int. Cl.
   *H04W 88/08* (2009.01)
   *H04W 84/04* (2009.01)

(56) References Cited

U.S. PATENT DOCUMENTS

| | | | | |
|---|---|---|---|---|
| 2010/0306613 | A1* | 12/2010 | Wu | H04B 7/0452 |
| | | | | 714/752 |
| 2011/0150114 | A1* | 6/2011 | Miao | H04B 7/0417 |
| | | | | 375/260 |
| 2011/0319118 | A1* | 12/2011 | Yu | H04W 52/40 |
| | | | | 455/522 |
| 2012/0170442 | A1* | 7/2012 | Razaviyayn | H04B 7/0456 |
| | | | | 370/203 |
| 2013/0237265 | A1* | 9/2013 | Khojastepour | H04W 74/00 |
| | | | | 455/509 |
| 2013/0259156 | A1* | 10/2013 | Baligh | H04L 25/03949 |
| | | | | 375/296 |
| 2014/0293904 | A1* | 10/2014 | Dai | H04B 7/024 |
| | | | | 370/329 |
| 2015/0365967 | A1* | 12/2015 | Ni | H04B 7/0456 |
| | | | | 370/329 |
| 2016/0119941 | A1* | 4/2016 | Ko | H04W 52/04 |
| | | | | 455/453 |
| 2017/0195017 | A1 | 7/2017 | Kim et al. | |
| 2018/0077604 | A1* | 3/2018 | Seyama | H04W 52/346 |
| 2018/0115381 | A1* | 4/2018 | Lincoln | H04B 7/024 |

OTHER PUBLICATIONS

Dilip Bethanabhotla et al., "Optimal User-Cell Association for Massive MIMO Wireless Networks," IEEE TWC, Mar. 2016.

George Athanasiou et al., "Optimizing Client Association for Load Balancing and Fairness in mmWave Wirelss Networks.," IEEE/ACM TNET, Jun. 2015.

* cited by examiner

APPARATUS AND METHOD FOR INTEGRATED BEAMFORMING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0069295, filed on Jun. 15, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) POSTECH ACADEMY-INDUSTRY FOUNDATION.

BACKGROUND

1. Field

The disclosure relates to a wireless communication system. More particularly, the disclosure relates to an apparatus and a method for performing integrated beamforming in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a multi-cell environment, inter-user interference and inter-cell interference cause beamforming performance degradation of a base station. That is, the base station may obtain imperfect channel information from a reference signal received from a terminal, and needs to control such interferences based on the obtained imperfect channel information.

Meanwhile, an ideal massive MIMO system which assumes the infinite number of base station antennas has channel hardening effect which cancels the inter-user interference and the inter-cell interference. Hence, in the massive MIMO system, researches are conducted mainly on through-put increase based on maximum ratio transmission (MRT) or zero-forcing (ZF) beamforming independently of power allocation or user scheduling. However, unlike the ideal case, the actual MIMO system is not subject to the channel hardening effect. Besides, an existing beamforming scheme (e.g., MRT beamforming, ZF beamforming), which is simple, cancels the channel between users, but is very sensitive to error and amplifies noise.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for performing integrated beamforming in a wireless communication system.

Another aspect of the disclosure is to provide an apparatus and a method for determining a beamforming vector if a single cell is operated in a wireless communication system.

Additional aspects will be set forth in part in the description which follows and, in part, will be apparent from the description, or may be learned by practice of the presented embodiments.

Another aspect of the disclosure is to provide an apparatus and a method for determining a beamforming vector in multi-cell coordination in a wireless communication system.

Another aspect of the disclosure is to provide an apparatus and a method for determining a beamforming vector in limited multi-cell coordination in a wireless communication system.

In accordance with an aspect of the disclosure, an operating method of a base station in a wireless communication system is provided. The operating method includes estimating a channel for each of a plurality of terminals based on reference signals received from the plurality of the terminals, determining a beamforming vector matrix for each of the plurality of the terminals by considering scheduling and power allocation information based on the estimated channels, and transmitting data to at least one of the plurality of the terminals using the determined beamforming vector matrix.

In accordance with another aspect of the disclosure, an apparatus of a base station in a wireless communication system is provided. The apparatus includes a transceiver and at least one processor functionally coupled to the transceiver, wherein the at least one processor is configured to estimate a channel for each of a plurality of terminals based on reference signals received from the plurality of the terminals, determine a beamforming vector matrix for each of the plurality of the terminals by considering scheduling and power allocation information based on the estimated channels, and transmit data to at least one of the plurality of the terminals using the determined beamforming vector matrix.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
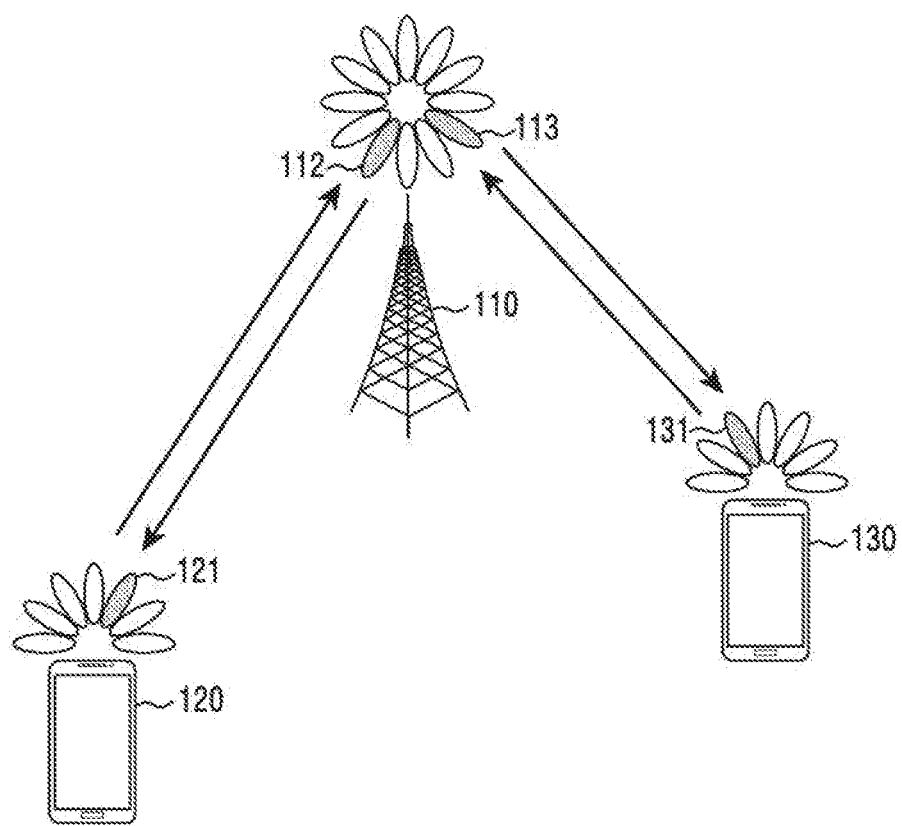
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the disclosure pertains. Among terms used in the disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the disclosure.

In various embodiments of the disclosure to be described below, a hardware approach will be described as an example. However, since the various embodiments of the disclosure include a technology using both hardware and software, the various embodiments of the disclosure do not exclude a software-based approach.

Hereafter, the disclosure relates to an apparatus and a method for integrated beamforming in a wireless communication system. Specifically, the disclosure provides a beamforming technique for weighted spectral efficiency maximization in conjunction with power allocation and user scheduling in the wireless communication system.

Terms indicating signals, terms indicating channels, terms indicating control information, terms indicating variables for an algorithm, terms indicating network entities, and terms indicating components of an apparatus, which are used in the following descriptions, are for the sake of explanations. Accordingly, the disclosure is not limited to the terms to be described, and may use other terms having technically identical meaning.

The disclosure describes various embodiments by using terms used in some communication standards (e.g., 3rd generation partnership project (3GPP)), which is merely an example for the explanations. Various embodiments of the disclosure may be easily modified and applied in other communication systems.

FIG. 1 illustrates a wireless communication system according to various embodiments of the disclosure.

Referring to FIG. 1, it depicts a base station 110, a terminal 120, and a terminal 130, as some of nodes which use a radio channel in the wireless communication system. While FIG. 1 depicts the single base station, the same or similar base station to the base station 110 may be further included.

The base station 110 is a network infrastructure which provides radio access to the terminals 120 and 130. The base station 110 has coverage defined as a geographical area, based on a signal transmission distance. The base station 110 may be referred to as an access point (AP), an eNodeB (eNB), a 5th generation node (5G node), a wireless point, a transmission/reception point (TRP), or other term having a technically equivalent meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 performs machine type communication (MTC) and may not be carried by the user. The terminal 120 and the terminal 130 each may be referred to as a user equipment (UE), a mobile station, a subscriber station, a remote terminal, a wireless terminal, a user device, or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). To improve a channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a receive signal. For doing so, the base station 110 and the terminals 120 and 130 may select serving beams 112, 113, 121, and 131 through beam search or beam management. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

Figure 2:
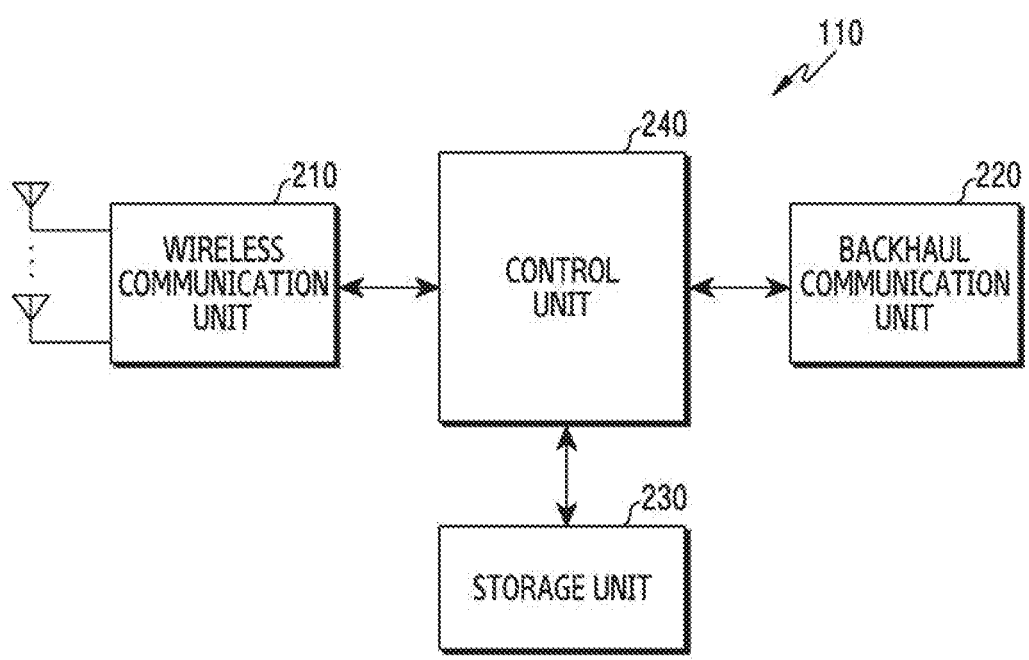
FIG. 2 illustrates a configuration of a base station in a wireless communication system according to an embodiment of the disclosure.

FIG. 2 illustrates a configuration of a base station in a wireless communication system according to various embodiments of the disclosure.

The configuration of FIG. 2 may be understood as the configuration of the base station 110. A term such as 'portion' or 'er' indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements.

In view of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As such, the wireless communication unit 210 transmits and receives the signals. Hence, whole or part of the wireless communication unit 210 may be referred to as a transmitter, a receiver, or a transceiver. In the following, the transmission and the reception over the radio channel embrace the above-stated processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data in response to a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to other embodiment, the protocol stack may be included in the wireless communication unit 210. For doing so, the control unit 240 may include at least one processor. Herein, a channel estimator, a proportional-fair (PF) scheduler, a weight determiner, a signal to interference plus noise ratio (SINR) estimator, and a beamforming vector determiner may be, as an instruction set or code stored in the storage unit 230, instructions/code resided in the control unit 240 at least temporarily or a storage space storing the instructions/code, or part of circuitry of the control unit 240.

According to various embodiments, the control unit 240 may estimate a channel for each terminal based on reference signals received from terminals respectively, and determines a matrix indicating beamforming vectors for the terminals by considering scheduling and power allocation information, based on the estimated channel information. For example, the control unit 240 may control the base station to carry out operations to be explained according to various embodiments.

Figure 3:
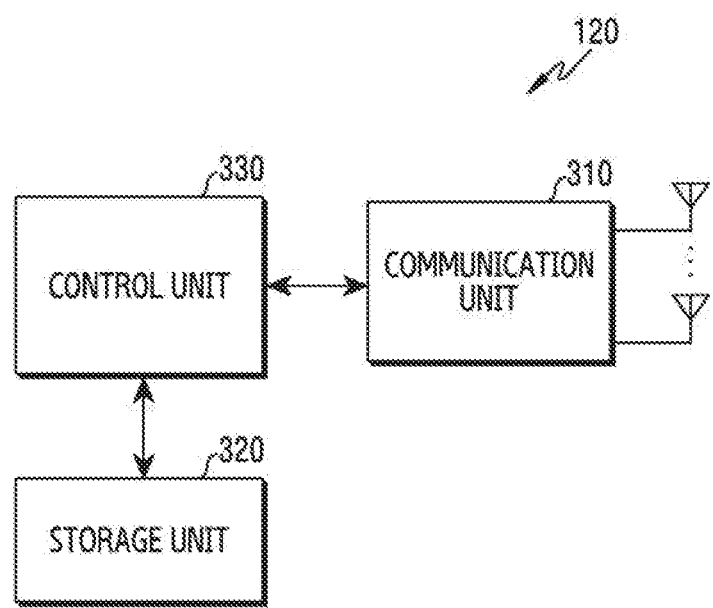
FIG. 3 illustrates a configuration of a terminal in a wireless communication system according to an embodiment of the disclosure.

FIG. 3 illustrates a configuration of a terminal in a wireless communication system according to various embodiments of the disclosure.

The configuration of FIG. 3 may be understood as the configuration of the terminal 120. A term such as 'portion' or er' indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 may transmit and receive signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

As such, the communication unit 310 transmits and receives the signals. Hence, whole or part of the communication unit 310 may be referred to as a transmitter, a receiver, or a transceiver. Hereafter, the transmission and the reception over the radio channel embrace the above-stated processing of the communication unit 310.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. Part of the communication unit 310 and the control unit 330 may be referred to as a communication processor (CP).

According to various embodiments, the control unit 330 may transmit a reference signal to the bases station, and, based on the reference signal, the base station may determine a matrix indicating beamforming vectors for terminals by considering scheduling and power allocation information. In addition, the control unit 330 may receive data which uses the matrix indicating the beamforming vectors, from the base station. For example, the control unit 330 may control the terminal to carry out operations, to be explained, according to various embodiments.

Figure 4A:
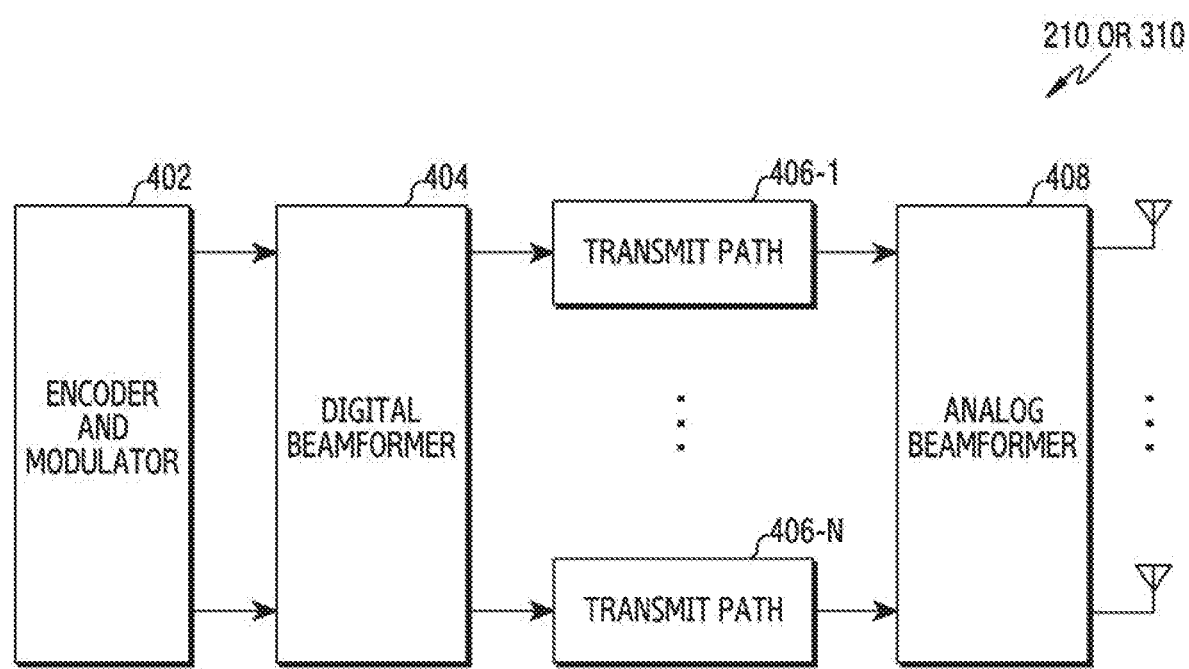
FIG. 4A illustrates a configuration of a communication unit in a wireless communication system according to an embodiment of the disclosure.
Figure 4B:
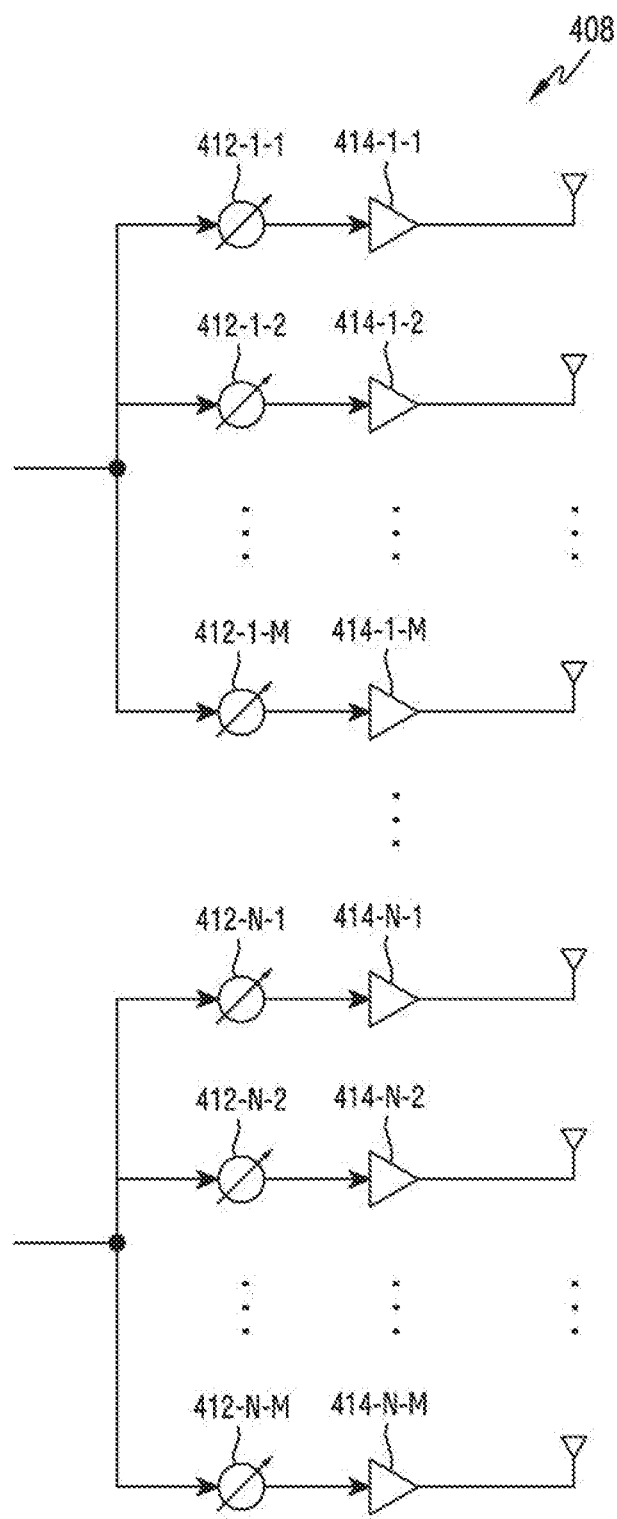
FIG. 4B illustrates a configuration of a communication unit in a wireless communication system according to an embodiment of the disclosure.
Figure 4C:
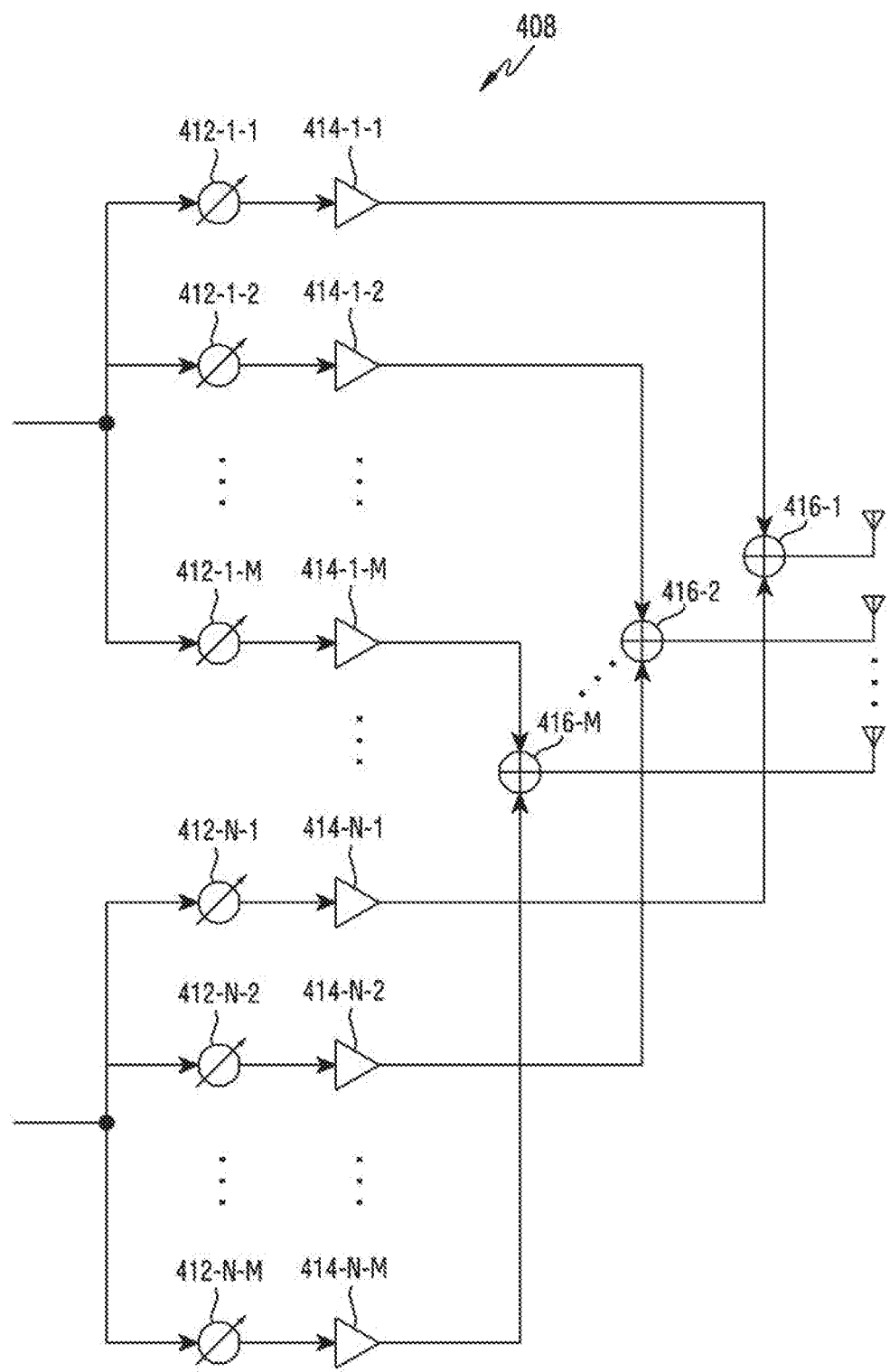
FIG. 4C illustrates a configuration of a communication unit in a wireless communication system according to an embodiment of the disclosure.

FIG. 4A illustrates a configuration of a communication unit in a wireless communication system according to various embodiments of the disclosure, FIG. 4B illustrates the configuration of the communication unit in the wireless communication system according to various embodiments of the disclosure, and FIG. 4C illustrates the configuration of the communication unit in the wireless communication system according to various embodiments of the disclosure.

FIGS. 4A, 4B, and 4C depict a detailed configuration of the wireless communication unit 210 of FIG. 2 or the communication unit 310 of FIG. 3.

More specifically, FIGS. 4A, 4B, and 4C depict components for performing the beamforming, as part of the wireless communication unit 210 of FIG. 2 or the communication unit 310 of FIG. 3.

Referring to FIG. 4A, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to change an amplitude and a phase of the signal, and may be referred to as a precoding matrix or a precoder. The digital beamformer 404 outputs the digital-beamformed modulation symbols to the transmit paths 406-1 through 406-N. In so doing, according to multiple-input multiple-output (MIMO) transmission, the modulation symbols may be multiplexed or the same modulation symbols may be fed to the transmit paths 406-1 through 406-N.

The transmit paths 406-1 through 406-N convert the digital-beamformed digital signals to analog signals. For doing, the transmit paths 406-1 through 406-N each may include an inverse fast fourier transform (IFFT) operator, a cyclic prefix (CP) adder, a DAC, and an up-converter. The CP adder is used for orthogonal frequency division multiplexing (OFDM), and may be excluded if another physical layer scheme (e.g., filter bank multi-carrier (FBMC)) is applied. That is, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. For doing so, the digital beamformer 404 multiplies the analog signals by the beamforming weights. Herein, the beamforming weights are used to change the amplitude and the phase of the signal. More specifically, the analog beamformer 408 may be configured as shown in FIG. 4B or FIG. 4C, according to a connection structure between the transmit paths 406-1 through 406-N and the antennas.

Referring to FIG. 4B, signals inputted to the analog beamformer 408 are converted in phase/amplitude, amplified, and then transmitted via the antennas. In so doing, signals of each path are transmitted via different antenna sets, that is, antenna arrays. Signals inputted in a first path are converted by phase/amplitude converters 412-1-1 through 412-1-M and 412-N-1 through 412-N-M to signal strings having different or the same phase/amplitude, amplified by amplifiers 414-1-1 through 414-1-M and 414-N-1 through 414-N-M, and then transmitted via the antennas.

Referring to FIG. 4C, signals inputted to the analog beamformer 408 are converted in phase/amplitude, amplified, and then transmitted via antennas. In so doing, signals of each path are transmitted via the same antenna set, that is, the same antenna array. Signals inputted in the first path are converted by the phase/magnitude converters 412-1-1 through 412-1-M to signal strings having different or the same phase/amplitude, and amplified by the amplifiers 414-1-1 through 414-1-M. To transmit via a single antenna array, the amplified signals are summed by adders 416-1-1 through 416-1-M based on the antenna element and then transmitted via the antennas.

The independent antenna array is used per transmit path in FIG. 4B, and the transmit paths share the single antenna array in FIG. 4C. However, according to another embodiment, some transmit paths may use the independent antenna array, and the rest transmit paths may share one antenna array. Further, according to yet another embodiment, by applying a switchable structure between the transmit paths and the antenna arrays, a structure which adaptively changes according to a situation may be used.

Figure 5:
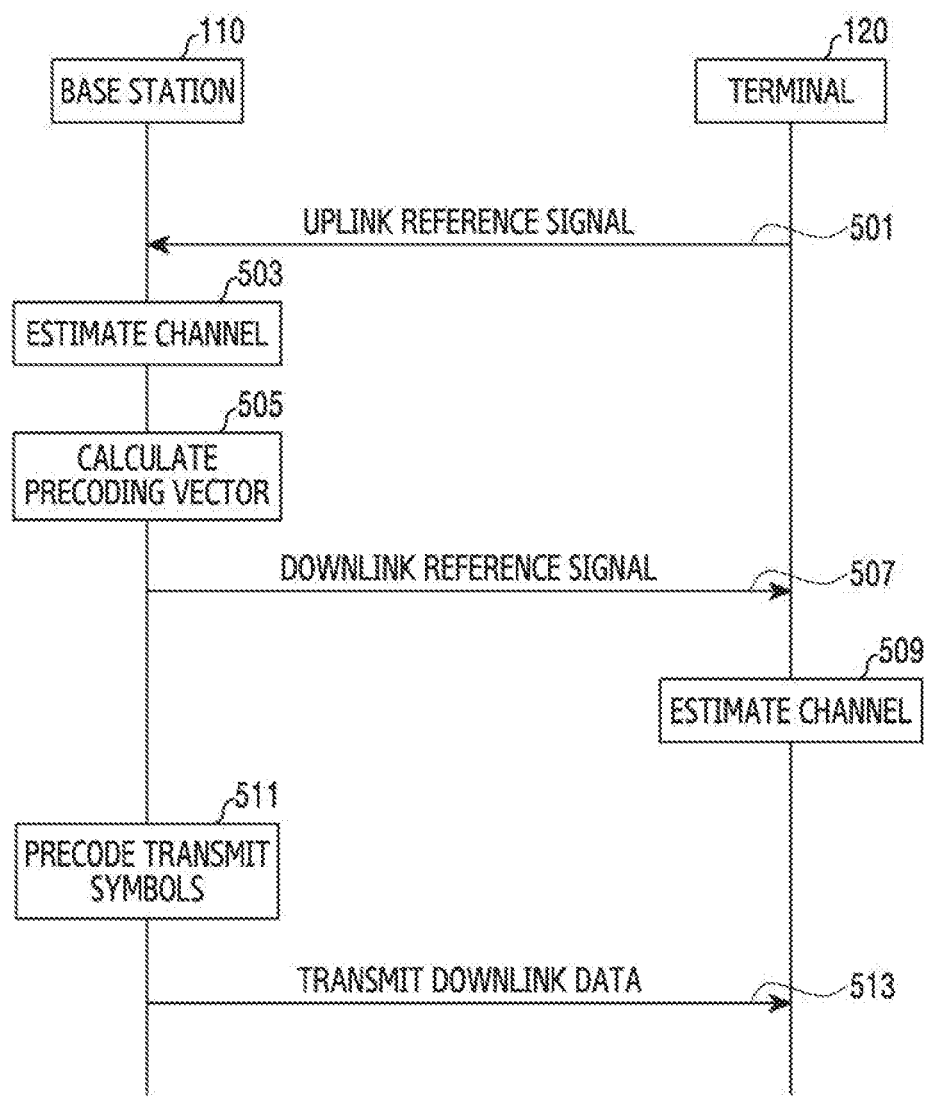
FIG. 5 illustrates a flowchart of an operating method of a base station and a terminal in a wireless communication system according to an embodiment of the disclosure.

FIG. 5 illustrates a flowchart of an operating method of a base station and a terminal in a wireless communication system according to various embodiments of the disclosure.

FIG. 5 illustrates the operations of the base station 110 and the terminal 120, if time dividing duplex (TDD) is used. However, according to other embodiment, the operating method of FIG. 5 may be similarly applied to a procedure between the base station 110 and a plurality of terminals.

Referring to FIG. 5, in operation 501, the terminal 120 transmits an uplink reference signal to the base station 110. Herein, the uplink reference signal may include a sounding reference signal (SRS), a pilot signal, and a demodulation (DM)-RS. In so doing, the terminal 120 may transmit the generated reference signal using a sequence allocated from the base station 110. Hence, the base station 110 may identify interference between the terminal and other terminal using the uplink reference signal. That is, to determine the interference between the terminals, the base station 110 receives uplink reference signals from the terminal 120 and at least one other terminal. At this time, pilot contamination may occur due to the interference with the uplink reference signal received from other terminal.

In operation 503, the base station 110 may estimate an uplink channel for the terminal 120 based on the received reference signal. In operation 505, the base station 110 calculates a precoding vector. In so doing, due to the pilot contamination, channel information may be imperfect.

In operation 507, the base station 110 transmits a downlink reference signal to the terminal 120. In operation 509, the terminal 120 estimates a downlink channel based on the received downlink reference signal. In operation 511, the base station 110 precodes transmit symbols. For doing so, the base station 110 may determine a precoding matrix, a precoder, or a beamformer, for precoding a signal transmitted to the terminal 120. In operation 513, the base station 110 transmits downlink data to the terminal 120. Herein, the downlink reference signal may include a beam reference signal (BRS), a beam refinement reference signal (BRRS), a cell-specific reference signal (CRS), a channel state information-reference signal (CSI-RS), a DM-RS, or a CSI-interference measurement (IM).

In FIG. 5, the uplink channel is estimated in operation 503 and the downlink channel is estimated in operation 509. That is, the uplink channel and the downlink channel are estimated by the separate operations. If the TDD is used, according to channel reciprocity, the base station 110 may use channel estimation information based on the uplink reference signal, for the downlink transmission. In this case, operation 509 where the terminal 120 estimates the channel based on the received downlink reference signal may be omitted.

However, since the pilot contamination still occurs even if the TDD is used, the base station 110 may obtain only the imperfect channel information of the terminals. As a result, the base station 110 needs to control the interference merely with the imperfect channel information obtained from the reference signal, a technique such as beamforming, power allocation, or user scheduling is required to maximize a sum specific efficiency and to improve a network environment.

In FIG. 5, the single terminal has been described. However, the method of FIG. 5 may be carried out between a plurality of terminals including the terminal 120 and the base station 110. In this case, the base station 110 may determine channel information for the terminals, and determine beamforming vectors of the terminals based on the channel information. According to various embodiments, the base station 110 may determine the beamforming vectors based on at least one of the channel information for the terminals, imperfectness of the channel information, and interference of a neighboring cell. In addition to determining the beamforming vectors, the base station 110 may further determine power for the terminals and scheduling.

Figure 6:
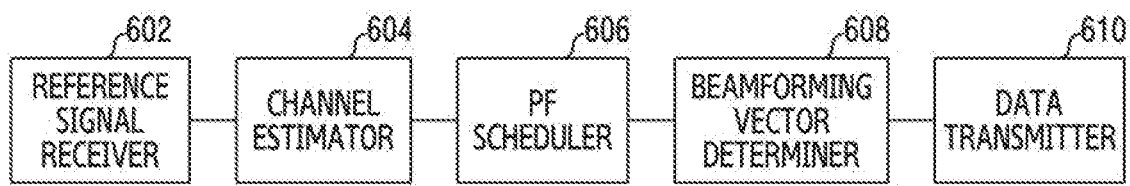
FIG. 6 illustrates a block diagram of operations of a base station in a wireless communication system according to an embodiment of the disclosure.

FIG. 6 illustrates a block diagram of operations of a base station in a wireless communication system according to various embodiments of the disclosure. FIG. 6 depicts the configuration of the base station 110 of FIG. 5 with the functional blocks.

Referring to FIG. 6, the base station may include a reference signal receiver 602, a channel estimator 604, a PF scheduler 606, a beamforming vector determiner 608, and a data transmitter 610.

The reference signal receiver 602 receives an uplink reference signal from the terminal 120, and the channel estimator 604 estimates a channel based on the received reference signal. The PF scheduler 606 determines scheduling metrics to satisfy fairness between terminals and to allocate resources based on the estimated channel state. The beamforming vector determiner 608 determines beamforming vectors in conjunction with user selection and power allocation based on the estimated channel information and a weight per terminal. Herein, the weight per terminal may be determined based on the scheduling metrics. The data transmitter 610 transmits downlink data to each terminal. In so doing, the data transmitter 610 may beamform transmit signals using the beamforming vectors determined by the beamforming vector determiner 608.

As stated above, the base station 110 may use the PF scheduler 606, to solve a fairness problem of the terminals in the downlink. In so doing, to maximize downlink weight spectral efficiency, a solution of the disclosure is to design the beamforming by jointly considering the user scheduling and the power allocation. Since weighted sum spectral efficiency maximization mathematically corresponds to non-convex optimization, an optimal result may not be guaranteed. Yet, the disclosure provides an algorithm which guarantees a first order Karush-Kuhn-Tucker condition and achieves near optimal results. According to the method of the disclosure, the beamforming technique which jointly considers the user scheduling and the power allocation in various base station environments (e.g., single/multi cooperative/multi limited coordination) may be designed with low complexity.

Figure 7:
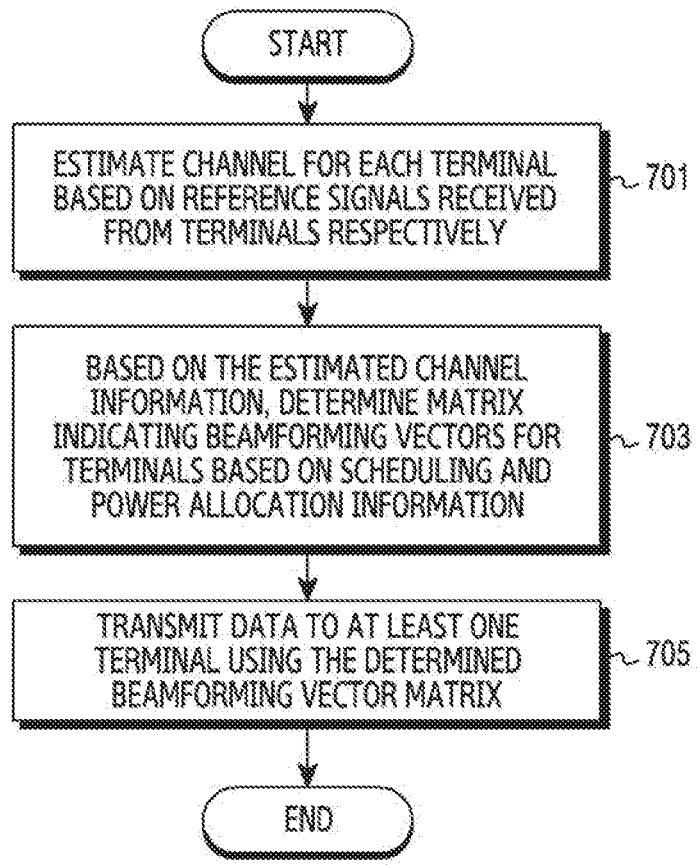
FIG. 7 illustrates a flowchart of operations of a base station in a wireless communication system according to an embodiment of the disclosure.

FIG. 7 illustrates a flowchart of operations of a base station in a wireless communication system according to various embodiments of the disclosure. FIG. 7 illustrates an operating method of the base station.

Referring to FIG. 7, in operation 701, the base station estimates a channel for each terminal based on reference signals from terminals respectively. Herein, the reference signal may include an SRS or a pilot signal. Since a reference signal received from a specific terminal is interfered by a reference signal received from other terminal, a channel estimated by the base station for the specific terminal may be imperfect. That is, the estimated channel information may further include error in addition to perfect channel information, and such imperfectness shall be considered in operation 703.

In operation 703, based on the estimated channel information, the base station determines a matrix indicating beamforming vectors for the terminals based on scheduling and power allocation information. For example, the base station may determine an initial beamforming vector, based on the channel information estimated for each terminal. The base station determines the matrix indicating optimal beamforming vectors by applying the scheduling information and the power allocation information to the determined initial beamforming vector. Herein, the scheduling information may be scheduling information according to the PF scheduling scheme, and the base station may determine a weight per terminal based on the PF scheduling information. The power allocation information may indicate power allocated to each terminal, and may be represented by a magnitude of the beamforming vector which is finally outputted. If the base station environment is multi-coordination, to consider interference from a coordinated cell, the base station may receive CSI-RS or CSI-IM from other cells. For example, the base station may use the received CSI-RS or CSI-IM to determine the matrix indicative of the beamforming vectors.

In operation 705, the base station transmits data to at least one terminal using the determined beamforming vector matrix. That is, the base station may beamform the terminals, and transmits the beamformed signals.

Now, the disclosure provides various embodiments for determining the beamforming vectors in consideration of different situations. Herein, the situations may be distinguished by whether a neighboring cell is considered, or whether indirect estimation is limited.

Figure 8:
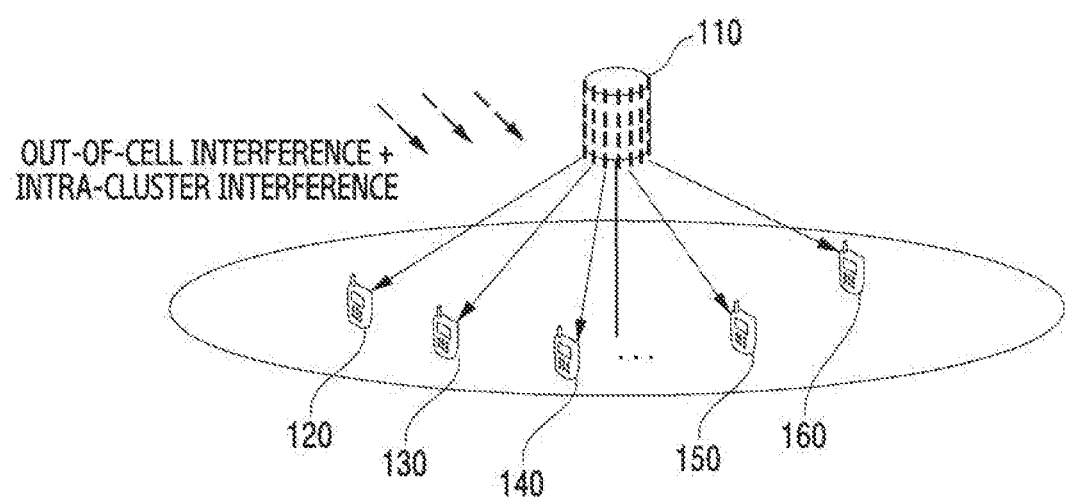
FIG. 8 illustrates single-cell operation in a wireless communication system according to an embodiment of the disclosure.

FIG. 8 illustrates single-cell operation in a wireless communication system according to various embodiments of the disclosure.

Referring to FIG. 8, in the single-cell operation, a base station 110 may transmit a signal using a multi-antenna, and terminals 120 through 160 may receive a signal using at least one antenna. In the single-cell operation, rather than multi-cell coordination, the base station 110 may not consider interference from neighboring cells. In addition, the base station 110 may receive reference signals from the terminals 120 through 160, and estimate a channel for each terminal based on the received reference signal. Herein, the reference signal may include an SRS or a pilot signal. According to various embodiments of the disclosure, the base station 110 may perform beamforming in conjunction with power allocation and user scheduling, by utilizing imperfect channel estimation information received from the in-cell terminals 120 through 160.

Figure 9:
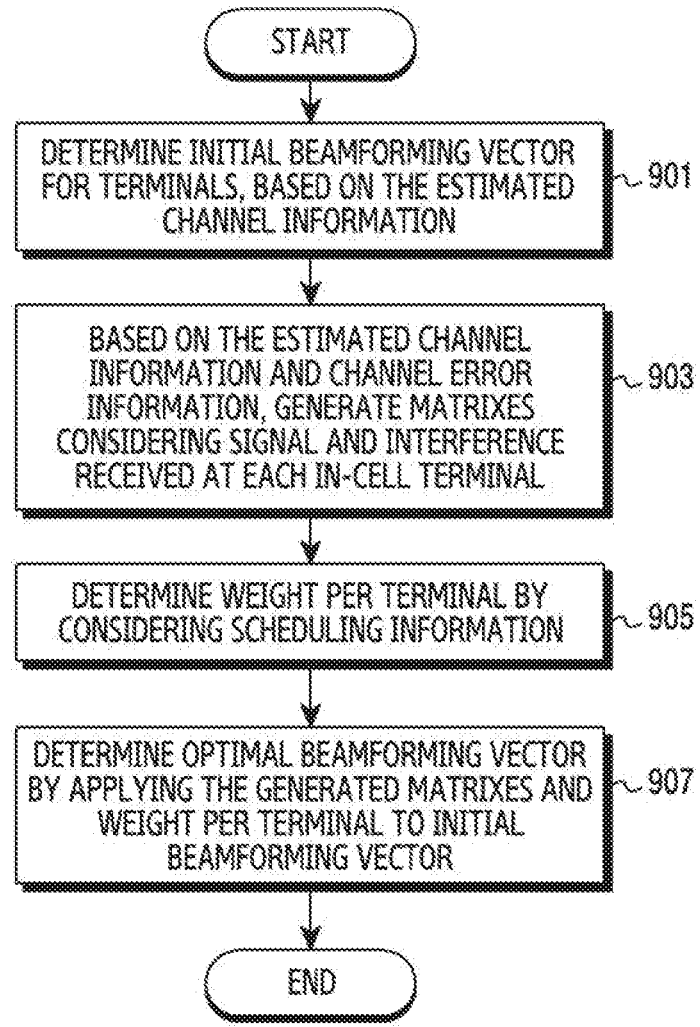
FIG. 9 illustrates a flowchart of a method for determining a beamforming vector of a base station for single-cell operation in a wireless communication system according to an embodiment of the disclosure.

FIG. 9 illustrates a flowchart of a method for determining a beamforming vector of a base station for single-cell operation in a wireless communication system according to various embodiments of the disclosure. The operations of FIG. 9 may be understood as specific operations of operation 703 of FIG. 7.

Referring to FIG. 9, in operation 901, the base station determines an initial beamforming vector for terminals each based on channel information estimated. Herein, the initial beamforming vector may be determined based on channel information estimated for each terminal in the base station. For example, the initial beamforming vector may be determined by a maximum ratio transmission (MRT) scheme, a minimum mean square error (MMSE) scheme, a zero-forcing (ZF), or other known scheme.

In operation 903, based on the estimated channel information and channel error information, the base station generates matrixes in consideration of a signal and interference received at each in-cell terminal. Herein, the channel error information may be expressed variously according to a channel estimation scheme. In particular, assuming that there is no correlation in channel per antenna, the channel error information may be represented with a channel error covariance matrix by applying the MMSE channel estimation. The matrixes generated by considering the signal and the interference received at each in-cell terminal may include a first matrix indicating channel information and interference information of each in-cell terminal, and a second matrix which excludes channel information of a particular terminal alone from the first matrix.

In operation 905, the base station determines a weight per terminal by considering scheduling information. For example, the scheduling information may be a scheduling matrix determined based on the PF scheduling scheme. Based on the scheduling information, the base station may, for example, determine the scheduling matrix as the weight or determine the weights by applying a predefined calculation to the scheduling matrix.

In operation 907, the base station may determine an optimal beamforming vector by applying the generated matrixes and the weight per terminal to the initial beamforming vector. For example, the base station may generate a third matrix by applying the first matrix and the weight per terminal to the initial beamforming vector, and a fourth matrix by applying the second matrix and the weight per terminal to the initial beamforming vector. Herein, the third matrix and the fourth matrix rely on the beamforming vectors. The base station may determine other beamforming vectors, based on an inverse of the fourth matrix and the third matrix. In so doing, the base station may normalize the determined beamforming vector. The base station may determine whether the determined beamforming vectors converge, repeat the above-stated process on the other beamforming vectors determined, and thus determine, that is, update other beamforming vector. Through such iterations, the base station may determine an optimal beamforming vector. For example, whether the determined beamforming vectors converge may be determined by whether a difference between a previously determined beamforming vector (a first beamforming vector determined) and a currently determined beamforming vector (a second beamforming vector determined) falls below a specific threshold or whether the iterations are conducted for a preset number of times.

As above, the beamforming vectors for the terminals in the single cell operation may be determined. In the following, specific operations of the base station for determining the beamforming vector are described with equations and FIG. 10.

Figure 10:
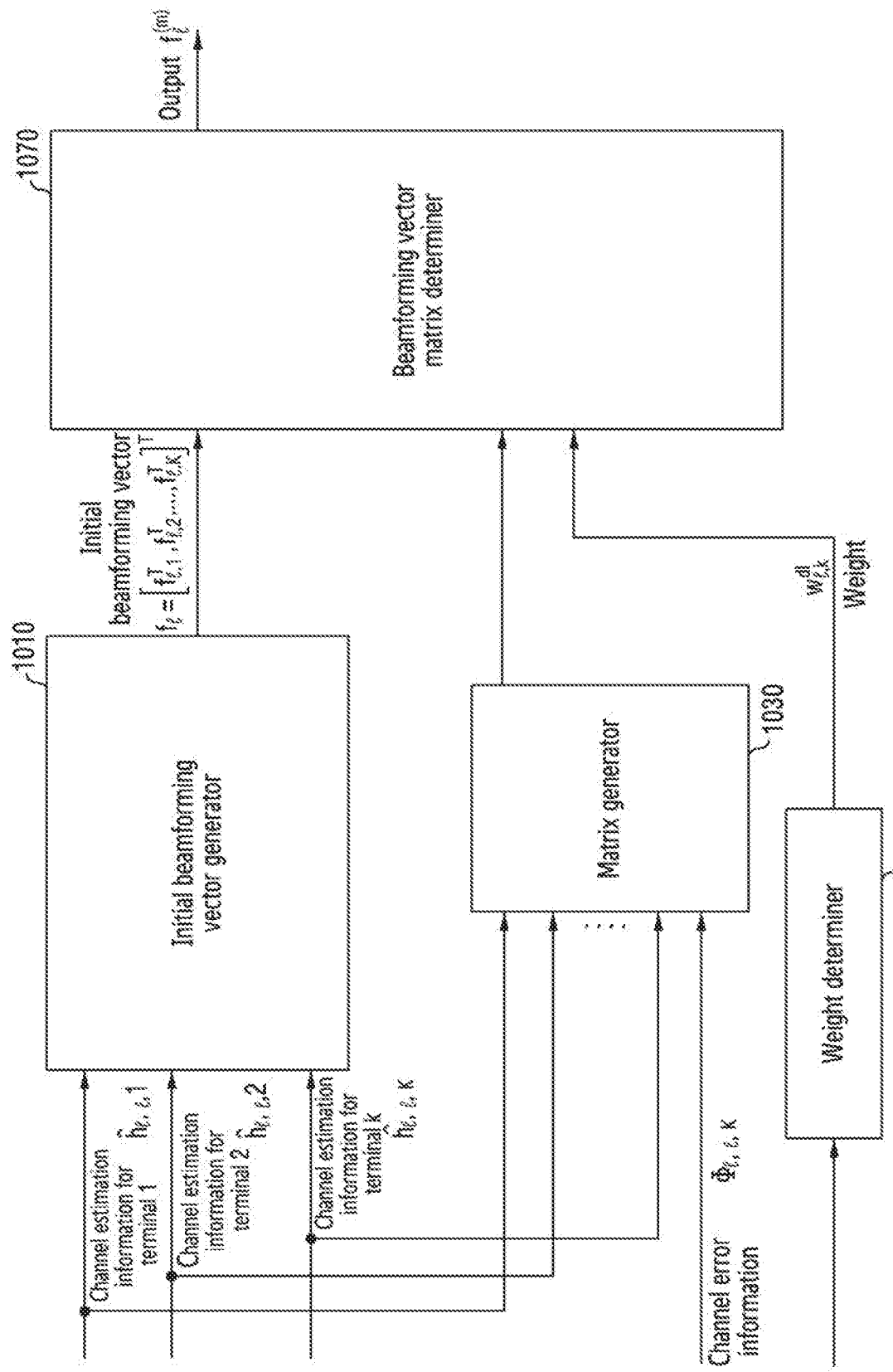
FIG. 10 illustrates a block diagram of operations of a beamforming vector determiner of a base station for single-cell operation in a wireless communication system according to an embodiment of the disclosure.

FIG. 10 illustrates a block diagram of operations of a beamforming vector determiner of a base station for single-cell operation in a wireless communication system according to various embodiments of the disclosure. FIG. 10 represents the configuration of the beamforming vector determiner 608 with functional blocks.

Referring to FIG. 10, the beamforming vector determiner 608 includes an initial beamforming vector generator 1010, a matrix generator 1030, a weight determiner 1050, and a beamforming vector matrix determiner 1070.

The initial beamforming vector generator 1010 generates an initial beamforming vector for each terminal based on channel estimation information of the terminal. For example, in the single cell operation, based on an l-th base station of multiple base stations, it is assumed that there are k-ary terminals in the l-th base station. A signal transmitted by the l-th base station to the k-ary terminals through the beamforming is defined as Equation 1.

$$\Sigma_{i=1}^{K} f_{l,i} s_{l,i} \qquad \text{Equation 1}$$

In Equation 1, K denotes the number of terminals in the l-th base station, $f_{l,i}$ denotes a beamforming vector transmitted from the l-th base station to an i-th terminal, and $s_{l,i}$ denotes a symbol transmitted from the l-th base station to the i-th in-cell terminal. Accordingly, a signal received at the k-th in-cell terminal of the l-th base station is defined as Equation 2.

$$y_{l,k} = \sqrt{\beta_{l,k}} h_{l,k}^H f_{l,k} s_{l,k} + \Sigma_{i \neq k}^{K} \sqrt{\beta_{l,k}} h_{l,k}^H f_{l,i} s_{l,i} + \tilde{n}_{l,k} \qquad \text{Equation 2}$$

In Equation 2, $y_{l,k}$ denotes the received signal of the k-th terminal in the l-th base station, $\beta_{l,k}$ denotes a path loss between the l-th base station and the k-th terminal, $h_{l,k}^H$ denotes a channel between the l-th base station and the k-th terminal, $f_{l,k}$ denotes a beamforming vector transmitted by the l-th base station to the k-th terminal, $s_{l,k}$ denotes a symbol transmitted from the l-th base station to the k-th in-cell terminal, $f_{l,i}$ denotes a beamforming vector from the l-th base station to the i-th in-cell terminal, and $s_{l,i}$ denotes a symbol transmitted from the l-th base station to the i-th in-cell terminal. $\sqrt{\beta_{l,k}} h_{l,i}^H$ denotes a channel response between the base station and the i-th terminal based on signal attenuation effect. $\sqrt{\beta_{l,k}} h_{l,k}^H f_{l,k} s_{l,k}$ denotes a desired signal to be received from the base station at the k-th terminal which is the particular terminal. $\Sigma_{i \neq k}^{K} \sqrt{\beta l,k} h_{l,k}^H f_{l,i} s_{l,i}$ denotes an inter-in-cell-terminal interference (e.g., inter-user interference (ICI) signal) from the terminal. $\tilde{n}_{l,k}$ denotes an effective noise signal (e.g., a signal including thermal noise at an out-of-cell interference base station) of the k-th terminal of the l-th base station.

As mentioned above, since the reference signal received from the particular terminal is interfered by the reference signal received from other terminal, the channel estimated by the base station for the particular terminal may be imperfect. Hence, perfect channel estimation information may be expressed as $h_{l,i}^H$, imperfect channel estimation information may be expressed as $\hat{h}_{l,i}^H$, channel error information may be expressed as $e_{l,i}^H$, and Equation 3 may be given by applying the relation of $h_{l,i}^H - \hat{h}_{l,i}^H = e_{l,i}^H$ to Equation 2.

$$y_{l,k} = \sqrt{\beta_{l,k}} \hat{h}_{l,k}^H f_{l,k} s_{l,k} + \Sigma_{i \neq k}^{K} \sqrt{\beta_{l,k}} \hat{h}_{l,k}^H f_{l,i} s_{l,i} + \Sigma_{i=1}^{K} \sqrt{\beta_{l,k}} e_{l,k}^H f_{l,i} s_{l,i} + \tilde{n}_{l,k} \qquad \text{Equation 3}$$

In Equation 3, $y_{l,k}$ denotes the received signal of the k-th terminal in the l-th base station, $\beta_{l,k}$ denotes the path loss between the l-th base station and the k-th terminal, $\hat{h}_{l,k}$ denotes an imperfect channel between the l-th base station and the k-th terminal, $f_{l,k}$ denotes the beamforming vector transmitted by the l-th base station to the k-th terminal, $s_{l,k}$ denotes the symbol transmitted from the l-th base station to the k-th in-cell terminal, $f_{l,i}$ denotes the beamforming vector transmitted from the l-th base station to the i-th terminal, $s_{l,i}$ denotes the symbol transmitted from the l-th base station to the i-th in-cell terminal, and $e_{l,i}^H$ denotes the channel error between the l-th base station and the k-th terminal. Based on the estimated channel of the k-th terminal in Equation 3, the SINR may be determined based on Equation 4.

$$SINR_{l,k} = \frac{|\hat{h}_{l,k}^H f_{l,k}|^2}{\sum_{i \neq k}^{K} |\hat{h}_{l,k}^H f_{l,i}|^2 + \sum_{i=1}^{K} f_{l,i}^H \Phi_{l,k} f_{l,i} + \frac{\tilde{\sigma}_{l,k}^2}{P}} \quad \text{Equation 4}$$

In Equation 4, $SINR_{l,k}$ denotes the SINR of the channel between the l-th base station and the k-th terminal, $\Phi_{l,k}$ denotes a covariance matrix for the channel error between the l-th base station and the k-th terminal, $\hat{h}_{l,k}^H$ denotes an imperfect channel between the l-th base station and the k-th terminal, $f_{l,k}$ denotes the beamforming vector transmitted by the l-th base station to the k-th terminal, $f_{l,i}$ denotes the beamforming vector transmitted from the l-th base station to the i-th terminal, P denotes power of the transmit symbol, and $\tilde{\sigma}_{l,k}^2$ denotes an effective noise signal received at the i-th terminal of the l-th base station. Herein, the channel error covariance matrix may be expressed variously according to the channel estimation scheme. In so doing, provided that there is no correlation of the channel per antenna, $\Phi_{l,k}$ acquired by the base station by adopting the MMSE channel estimation may be expressed as Equation 5. Even with the channel correlation, the base station may acquire the channel error covariance matrix by adopting the MMSE channel estimation.

$$\Phi_{l,l,k} = \beta_{l,l,k}\left(1 - \frac{\beta_{l,l,k}}{\sum_{j=1}^{L} \beta_{l,j,k} + \frac{\sigma^2}{\tau^{ul}}}\right) I_N \quad \text{Equation 5}$$

In Equation 5, $\Phi_{l,l,k}$ denotes a covariance matrix for the channel error between the l-th base station and the k-th terminal of the l-th base station, $\beta_{l,l,k}$ denotes a path loss between the l-th base station and the k-th terminal of the l-th base station, $\tau^{ul}$ denotes a length of an uplink reference signal (e.g., SRS signal or pilot signal), and $I_N$ denotes an identity matrix. Under both of the noise and the interference signal, maximum spectral efficiency of each terminal is given by $\log_2(1+SINR)$. Hence, the sum spectral efficiency may be defined as Equation 6 by applying the weight to users in the l-th cell.

$$\sum_{k=1}^{K} w_{l,k} R_{l,k} = \log_2\left(\prod_{k=1}^{K}\left[\frac{\sum_{i=1}^{K} f_{l,i}^H (\hat{h}_{l,k}\hat{h}_{l,k}^H + \Phi_{l,i})f_{l,i} + \frac{\tilde{\sigma}_{l,k}^2}{P}}{\sum_{i \neq k}^{K} f_{l,i}^H \hat{h}_{l,k}\hat{h}_{l,k}^H f_{l,i} + \sum_{i=1}^{K} f_{l,i}^H \Phi_{l,i} f_{l,i} + \frac{\tilde{\sigma}_{l,k}^2}{P}}\right]^{w_{l,k}}\right) \quad \text{Equation 6}$$

In Equation 6, $w_{l,k}$ denotes the weight between the l-th base station and the k-th terminal, $R_{l,k}$ denotes the sum spectral efficiency for the k-th terminal of the l-th base station, $\Phi_{l,i}$ denotes a covariance matrix for the channel error between the l-th base station and the i-th terminal, $\hat{h}_{l,k}^H$ denotes the imperfect channel between the l-th base station and the k-th terminal, $f_{l,k}$ denotes the beamforming vector transmitted by the l-th base station to the k-th terminal, $f_{l,i}$ denotes the beamforming vector transmitted from the l-th base station to the i-th terminal, P denotes the power of the transmit symbol, and $\tilde{\sigma}_{l,k}^2$ denotes the effective noise signal received at the i-th terminal of the l-th base station. Based on Equation 6, the beamforming vectors $f_{l,i}$ for K-ary users for the maximization may be calculated.

Herein, for k-ary terminals in the l-th base station, the initial beamforming vector generator 1010 generates k-ary beamforming vectors for channel estimation information of the k-ary terminals respectively. Next, to formulate the beamforming vectors into the vector form (e.g., through serial-parallel conversion), the k-ary beamforming vectors may be concatenated as $f_l = [f_{l,1}^T, f_{l,2}^T, \ldots, f_{l,K}^T]^T$. Hence, Equation 6 may be formulated as Equation 7.

$$\sum_{i=1}^{K} f_{l,i}^H (\hat{h}_{l,k}\hat{h}_{l,k}^H + \Phi_{l,i})f_{l,i} + \frac{\tilde{\sigma}_{l,k}^2}{P} = f_l^H A_{l,k} f_l, \quad \text{Equation 7}$$

$$\sum_{i \neq k}^{K} f_{l,i}^H \hat{h}_{l,k}\hat{h}_{l,k}^H f_{l,i} + \sum_{i=1}^{K} f_{l,i}^H \Phi_{l,i} f_{l,i} + \frac{\tilde{\sigma}_{l,k}^2}{P} = f_l^H B_{l,k} f_l$$

In Equation 7, $\hat{h}_{l,k}^H$ denotes the imperfect channel between the l-th base station and the k-th terminal, $f_{l,k}$ denotes the beamforming vector transmitted by the l-th base station to the k-th terminal, $f_{l,i}$ denotes the beamforming vector transmitted from the l-th base station to the i-th terminal, P denotes the power of the transmit symbol, and $\tilde{\sigma}_{l,k}^2$ denotes the effective noise signal received at the i-th terminal of the l-th base station. $A_{l,k}$ denotes an orthogonal matrix for channel information and interference information of every in-cell terminal. For example, $A_{l,k}$ may indicate the first matrix as explained in FIG. 9. $B_{l,k}$ is a matrix excluding only channel information of a particular terminal from $A_{l,k}$, and indicates interference information for every in-cell terminal. For example, $B_{l,k}$ may indicate the second matrix as described in FIG. 9. Equation 7 is applied to the optimization problem and expressed as Equation 8.

$$\max_{f_l \in \mathbb{C}^{NK \times 1}} \prod_{k=1}^{K}\left[\frac{f_l^H A_{l,k} f_l}{f_l^H B_{l,k} f_l}\right]^{w_{l,k}} \text{ subject to } \|f_l\|_2^2 \leq 1 \quad \text{Equation 8}$$

In Equation 8, $w_{l,k}$ denotes the weight between the l-th base station and the k-th terminal, $A_{l,k}$ denotes the orthogonal matrix for the channel information and the interference information of every in-cell terminal, $B_{l,k}$ denotes the matrix excluding only channel information of the particular terminal from $A_{l,k}$, and $f_l$ denotes the beamforming vector. Equation 8, as the form of the optimization function, exhibits a product form of Rayleigh quotient and is subject to a category of the non-convex optimization problem. $A_{l,k}$ and $B_{l,k}$ of Equation 8 may be obtained from the matrix generator 1030.

The matrix generator 1030 generates the matrixes considering the signal and the interference received at each in-cell terminal based on the channel estimation information and the channel error information for each terminal. Herein, the channel error information indicates, as stated above, the difference between the imperfect channel and the perfect channel due to the out-of-cell interference and the intra-cell interference. The channel error information may be expressed as the channel error covariance matrix based on Equation 5. The matrixes considering the signal and the interference received at each in-cell terminal may include $A_{l,k}$ and $B_{l,k}$. At this time, $A_{l,k}$ may be defined as $$A_{l,k} = \begin{bmatrix} \hat{h}_{l,k}\hat{h}_{l,k}^H + \Phi_{l,1} & 0 & 0 & \cdots & 0 \\ \vdots & \ddots & \vdots & \ddots & \vdots \\ 0 & \vdots & \hat{h}_{l,k}\hat{h}_{l,k}^H + \Phi_{l,k} & \cdots & 0 \\ \vdots & \vdots & \vdots & \ddots & \vdots \\ 0 & 0 & 0 & \cdots & \hat{h}_{l,k}\hat{h}_{l,k}^H + \Phi_{l,K} \end{bmatrix} + \frac{\tilde{\sigma}_{l,k}^2}{P} I_{NK},$$

and $B_{l,k}$ may be defined as $$B_{l,k} = A_{l,k} - \begin{bmatrix} 0 & 0 & 0 & \cdots & 0 \\ \vdots & \vdots & \vdots & \ddots & \vdots \\ 0 & \cdots & \hat{h}_{l,k}\hat{h}_{l,k}^H & \cdots & 0 \\ \vdots & \vdots & \vdots & \ddots & \vdots \\ 0 & 0 & 0 & \cdots & 0 \end{bmatrix}.$$

The weight determiner 1050 determines the weight per terminal by considering scheduling information. Herein, the scheduling information includes scheduling information according to the PF scheduling scheme. As stated earlier, in FIG. 6, if the PF scheduler determines the scheduling metrics to satisfy the fairness of the terminals and to achieve the resource allocation based on the estimated channel state, the weight determiner 1050 may determine the weight from the scheduling metrics. The weight per terminal is expressed as $w_{l,k}$ of Equation 6, and is used to determine a matrix indicative of optimal beamforming vectors.

The beamforming vector matrix determiner 1070 determines the optimal beamforming vector by applying the generated matrixes and the weight per terminal to the initial beamforming vector, which may calculate the solution of Equation 8. Equation 8 is subject to the category of the non-convex optimization problem, and the method for acquiring the optimal beamforming vector $f_l$ is not known to those skilled in the art. According to various embodiments of the disclosure, Equation 9 may be acquired by finding a first order Karush-Kuhn-Tucker necessary condition for the optimal solution of this problem.

Equation 9

$$\overline{A}_l(f_l)f_l = \lambda(f_l)\overline{B}_l(f_l)f_l,$$

$$\overline{A}_l(f_l) = \sum_{i=1}^{K} w_{l,i}(f_l^H A_{l,i} f_l)^{w_{l,i}-1} \left(\prod_{k \neq i}^{K} f_l^H A_{l,k} f_l\right) A_{l,i},$$

$$\overline{B}_l(f_l) = \sum_{i=1}^{K} w_{l,i}(f_l^H B_{l,i} f_l)^{w_{l,i}-1} \left(\prod_{k \neq i}^{K} f_l^H B_{l,k} f_l\right) B_{l,i},$$

$$\lambda(f_l) = \prod_{k=1}^{K} \left[\frac{f_l^H A_{l,k} f_l}{f_l^H B_{l,k} f_l}\right]^{w_{l,k}}$$

In Equation 9, $\lambda(f_l)$ denotes the optimization function for the beamforming vector $f_l$, $w_{l,i}$ denotes the weight between the l-th base station and the i-th terminal, $\overline{A}_l(f_l)$ denotes a matrix calculated by applying the weight per terminal to $A_{l,k}$, and $\overline{B}_l(f_l)$ denotes the matrix calculated by applying the weight per terminal to $B_{l,k}$. At this time, $\overline{A}_l(f_l)$ may indicate the third matrix of FIG. 9, and $\overline{B}_l(f_l)$ may indicate the fourth matrix of FIG. 9. In addition, $\overline{A}_l(f_l)$ and $\overline{B}_l(f_l)$ are subject to $f_l$. If there is $f_l$ which maximizes $\lambda(f_l)$, $\lambda(f_l)$ and $f_l$ need to be the solutions of a generalized eigenvalue problem $\overline{A}_l(f_l)f_l = \lambda(f_l)\overline{B}_l(f_l)f_l$. Hence, by finding the maximum eighvalue $\lambda(f_l)$ satisfying it and a corresponding eigenvector $f_l$, the beamforming vector which maximizes the weighted sum spectral efficiency may be acquired. In the generalized eigenvalue problem $\overline{A}_l(f_l)f_l = \lambda(f_l)\overline{B}_l(f_l)f_l$ which is the objective function, the matrixes $\overline{A}_l(f_l)$ and $\overline{B}_l(f_l)$ are the functions for $f_l$ respectively, which is quite different from a generalized eigenvalue problem of the related art. To resolve this, the beamforming vector $f_l$ is updated iteratively using a general power iterative (GPI) algorithm.

TABLE 1

| Step 1 | Intitialize $f_l^0$ (MRT or ZFBF) |
|---|---|
| Step 2 | In the m-th iteration, |
| | Compute $[\tilde{B}_l(f_l^{(m-1)})]^{-1} \overline{A}_l(f_l^{(m-1)})$ |
| | $f_l^{(m)} := [\overline{B}_l(f_l^{(m-1)})]^{-1} \tilde{A}_l(f_l^{(m-1)}) f_l^{(m-1)}$ |
| | $$f_l^{(m)} := \frac{f_l^{(m)}}{\|f_l^{(m)}\|_2}$$ |
| Step 3 | Iterates until $\|f_l^{(m-1)} - f_l^{(m)}\|_2 \leq 1$ |

The GPI algorithm of Table 1 needs to calculate the inverse of $\overline{B}_l(f_l)$ in each iteration. $\overline{B}_l(f_l)$ is the square matrix of size KN×KN, and computations required to calculate the inverse are proportional to $K^3N^3$. However, since $\overline{B}_l(f_l)$ has a special structure, the Sherman-Morrison formula which is a divide and conquer method may be applied to calculate the inverse of the matrix.

In various embodiments of the disclosure, Equation 10 through Equation 13 compute the inverse of the matrix $\overline{B}_l(f_l)$, and $\overline{B}_l(f_l)$ is represented as a block diagonal matrix based on Equation 10.

$$\overline{B}_{l,l}(f_l) = \begin{bmatrix} \tilde{B}_{l,l,1}^{(K)}(f_l) & 0 & 0 & \cdots & 0 \\ \vdots & \ddots & \vdots & \ddots & \vdots \\ 0 & \vdots & \tilde{B}_{l,l,k}^{(K)}(f_l) & \cdots & 0 \\ \vdots & \vdots & \vdots & \ddots & \vdots \\ 0 & 0 & 0 & \cdots & \tilde{B}_{l,l,K}^{(K)}(f_l) \end{bmatrix}$$

Equation 10

Thus, the inverse of the block components are calculated to compute the inverse of the matrix $\overline{B}_l(f_l)$. The block components of the matrix $\overline{B}_l(f_l)$ are represented as a sum of a rank-1 matrix based on Equation 11.

$$\tilde{B}_{l,l,j}^{(K)}(f_l) = \Sigma_{i=1}^{K} d_{l,l,i}(f_l) \hat{h}_{l,l,i} \hat{h}_{l,l,i}^H + \delta_{l,l,j} I_N \in \mathbb{C}^{N \times N}$$

$$d_{l,l,i}(f_l) = \Sigma_{i=1}^{K} w_{l,i}(f_l^H B_{l,l,i} f_l)^{w_{l,i}-1}(\Pi_{k \neq i}^{K} f_l^H B_{l,l,k} f_l)$$

Equation 11

In Equation 11, $\tilde{B}_{l,l,j}^{(K)}$ denotes each block component of $\overline{B}_l(f_l)$, K denotes the number of terminals in the l-th base station, $f_l$ denotes the beamforming vector, $w_{l,i}$ denotes the weight between the -th base station and the i-th terminal, $B_{l,l,k}$ denotes the matrix excluding only channel information of the l-th base station and the k-th terminal of the l-th base station from the orthogonal matrix of the channel information and the interference information for every in-cell terminal, $\hat{h}_{l,l,i}$ denotes the imperfect channel between the l-th base station and the j-th terminal of the l-th base station, $\delta_{l,l,j}$ denotes a unit vector between the l-th base station and the j-th terminal of the l-th base station, and $I_N$ denotes the identity matrix. To formulate the inverse of Equation 11 with low complexity through a recursion equation, a matrix of Equation 12 is first defined.

$$\tilde{B}_{l,l,j}^{(k)}(f_l) = \delta l, l I_N \Sigma_{i=1}^k d_{l,l,i}(f_l) \hat{h}_{l,l,i} \hat{h}_{l,l,i}^H$$

$$d_{l,l,i}(f_l) = \Sigma_{i=1}^K w_{l,i}(f_l^H B_{l,l,i} f_l)^{\nu^{j,i}-1}(\Pi_{k=i}^K f_l^H B_{l,l,i} f_l) \quad \text{Equation 12}$$

In Equation 12, $\tilde{B}_{l,l,j}^{(k)}$ denotes each block component of $\overline{B}_l(f_l)$, k denotes the number of terminals in the l-th base station, $w_{l,i}$ denotes the weight between the l-th base station and the i-th terminal, $B_{l,l,k}$ denotes the matrix excluding only channel information of the l-th base station and the k-th terminal of the l-th base station from the orthogonal matrix of the channel information and the interference information for every in-cell terminal, $f_l$ denotes the beamforming vector, $\hat{h}_{l,l,i}$ denotes the imperfect channel between the l-th base station and the i-th terminal of the l-th base station, $\delta_{l,l}$ denotes a unit vector between the l-th base station and the l-th base station, and $I_N$ denotes the identity matrix. The recursion equation of Equation 13 may be acquired by applying the Sherman-Morrison formula to the matrix of Equation 12.

$$[\tilde{B}_{l,l,j}^{(k)}(f_l)]^{-1} = [\tilde{B}_{l,l,j}^{(k-1)}(f_l)]^{-1} - \frac{[\tilde{B}_{l,l,j}^{(k-1)}(f_l)]^{-1} \hat{h}_{l,l,k} [\tilde{B}_{l,l,j}^{(k-1)}(f_l)]^{-1} \hat{h}_{l,l,k}^H}{\frac{1}{d_{l,l,k}(f_l)} + \hat{h}_{l,l,k}^H [\tilde{B}_{l,l,j}^{(k-1)}(f_l)]^{-1} \hat{h}_{l,l,k}}$$

$$[\tilde{B}_{l,l,j}^{(1)}(f_l)]^{-1} = [d_{l,l,1}(f_l) \hat{h}_{l,l,1} \hat{h}_{l,l,1}^H + \delta_{l,l} I_N]^{-1} =$$

$$\delta_{l,l}^{-1} \left[ I_N - \frac{d_{l,l,1}(f_l) \hat{h}_{l,l,1} \hat{h}_{l,l,1}^H}{\delta_{l,l} + d_{l,l,1}(f_l) \hat{h}_{l,l,1}^H \hat{h}_{l,l,1}} \right]$$

Equation 13

In Equation 13, $\tilde{B}_{l,l,j}^{(k)}$ denotes each block component of $\overline{B}_l(f_l)$, $f_l$ denotes the beamforming vector, $\hat{h}_{l,l,i}$ denotes the imperfect channel between the l-th base station and the i-th terminal of the l-th base station, $\delta_{l,l}$ denotes the unit vector between the l-th base station and the l-th base station, and $I_N$ denotes the identity matrix. The inverse of $\overline{B}_l(f_l)$ may be calculated based on Equation 13. The inverse calculation based on Equation 13 requires complexity in proportion to $KN^2$. Thus, the power allocation and user scheduling integrated beamforming design problem may be addressed with low complexity, and the beamforming vector which is local optimum for each terminal may be determined.

Figure 11:
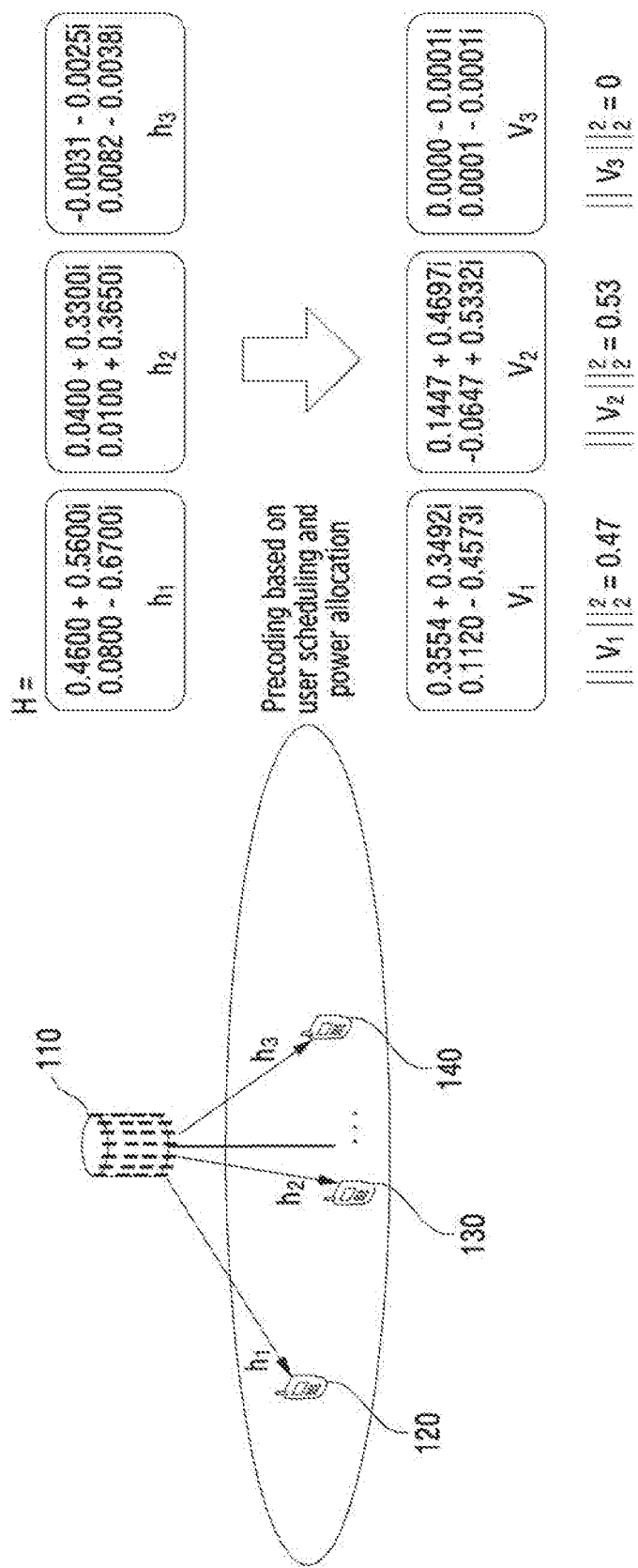
FIG. 11 illustrates integrated beamforming results in a wireless communication system according to an embodiment of the disclosure.

FIG. 11 illustrates integrated beamforming results in a wireless communication system according to various embodiments of the disclosure.

Referring to FIG. 11, it illustrates that three terminals 120, 130, and 140 in a single cell have different channels respectively. Through the process of FIG. 10, a base station 110 determines beamforming vectors v1, v2, and v3 based on channel estimation information h1, h2, and h3 of the terminals 120, 130, and 140. Among the determined beamforming vectors v1, v2, and v3, the beamforming vector v3 for the terminal 140 corresponds to zero in magnitude of the beamforming vector. Hence, the scheduling through the beamforming of the base station 110 may be obtained. The beamforming vectors v1 and v2 of the terminal 120 and the terminal 130 are 0.47 and 0.53, which are different in magnitude, indicating that the beamforming of the base station 110 considers the power allocation.

Figure 12:
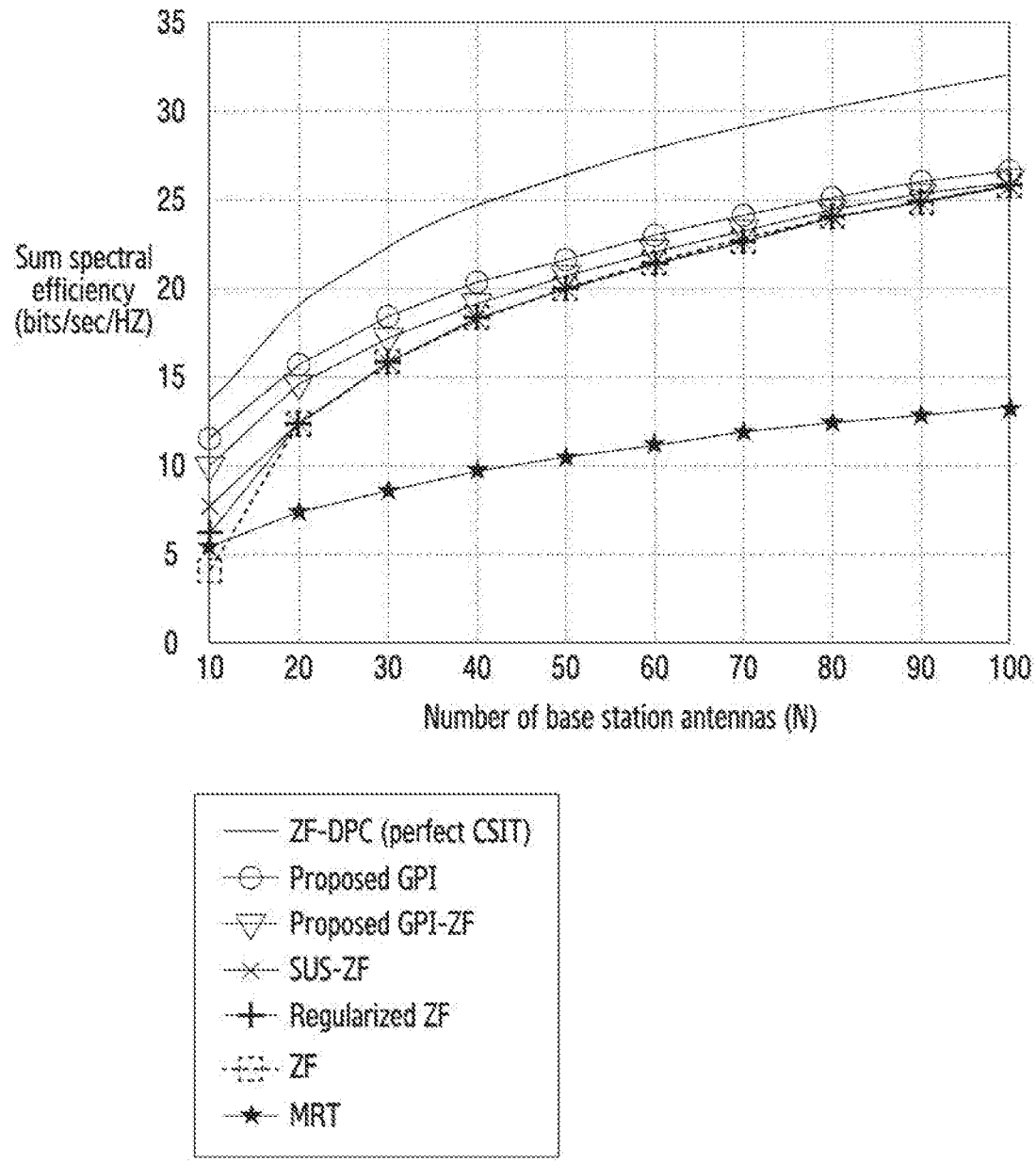
FIG. 12 illustrates a graph for comparing performance of integrated beamforming and beamforming of the related art based on a number of base station antennas in a wireless communication system according to an embodiment of the disclosure.
Figure 13:
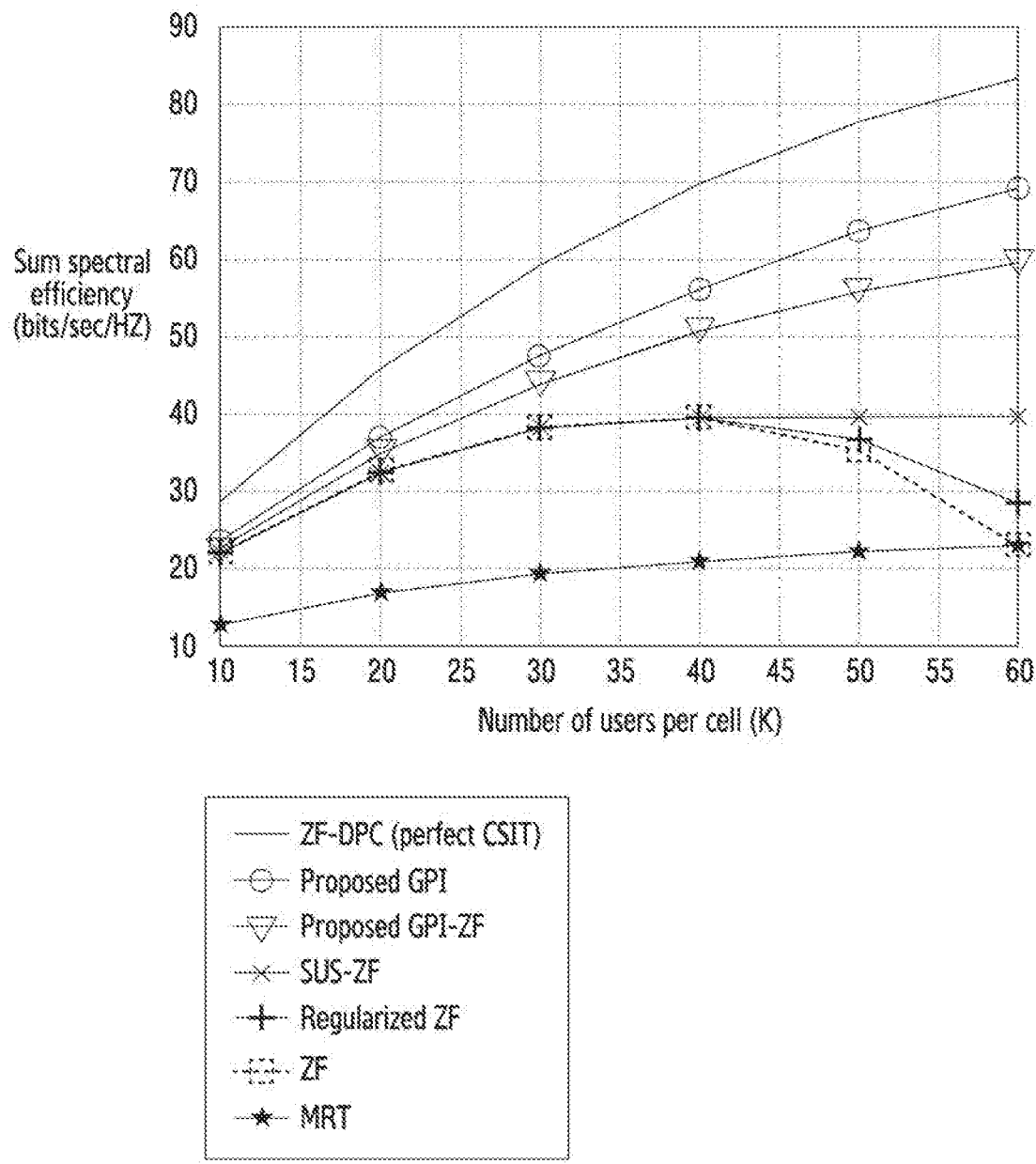
FIG. 13 illustrates a graph for comparing performance of integrated beamforming and beamforming of the related art based on a number of in-cell users in a wireless communication system according to an embodiment of the disclosure.

FIG. 12 illustrates a graph for comparing performance of integrated beamforming and beamforming of the related art based on the number of base station antennas in a wireless communication system according to various embodiments of the disclosure. FIG. 13 illustrates a graph for comparing performance of integrated beamforming and beamforming of the related art based on the number of in-cell users in a wireless communication system according to various embodiments of the disclosure.

Referring to FIGS. 12 and 13, a simulation environment sets a distance between base stations to 1000 m, a base station transmit power to 40 dBm, a transmit frequency to 2 GHz, and a bandwidth to 20 MHz. A channel model adopts an exponential correlation model, and a path loss model adopts the Okumura-Hata model. At this time, a shadowing standard variation is 8 dB. The beamforming vector weight $w_{l,k}$, III, k of FIGS. 12 and 13 is set to 1, and the beamforming vector $f_{l,k}$ is designed by the algorithm of Table 1 based on the imperfect channel information. FIG. 12 shows the sum spectral efficiency based on the number of the base station antennas, assuming that the number of users per cell is 10. FIG. 13 shows the sum spectral efficiency based on the number of the in-cell users, with 64 base station antennas. As shown in FIGS. 12 and 13, the scheduling and power allocation integrated beamforming achieves the improved sum spectral efficiency over the ZF of the related art and MRT and SUS-ZF (ZF) considering the scheduling.

While the beamforming weight is set to 1 in FIGS. 12 and 13 for the sake of explanations, the base station may set the weight based on various criteria for the fairness between the terminals in the actual environment. For example, if terminals each transmit an SRS for IM, not only channels of the terminals in the corresponding cell serviced from channel reciprocity but also a channel of a neighboring cell corresponding to leakage interference may be measured. The SINR of each terminal may be predicted based on such channel information. The fairness of the terminals may be increased, by setting the beamforming weight in inverse proportion to the SINR measurement value of each user. Alternatively, the beamforming weight may be designed based on a receive signal to noise ratio (SNR) as expressed in Equation 14.

$$w_{l,k} = \beta_l * 1 / \log_2(1 + |h_{l,l,k}^H|^2 P/\sigma_{l,k}^2)^\alpha$$

$$\beta_l = \max_{k=1,\ldots,K} \log_2(1 + |h_{l,l,k}^H|^2 P/\sigma_{l,k}^2)^\alpha$$

Equation 14

In Equation 14, a is the term for the terminal fairness. The greater a, the greater weight on the terminal of the small SINR. $\beta_l$ makes $w_{l,k}$ have a value between 0 and 1.

Figure 14:
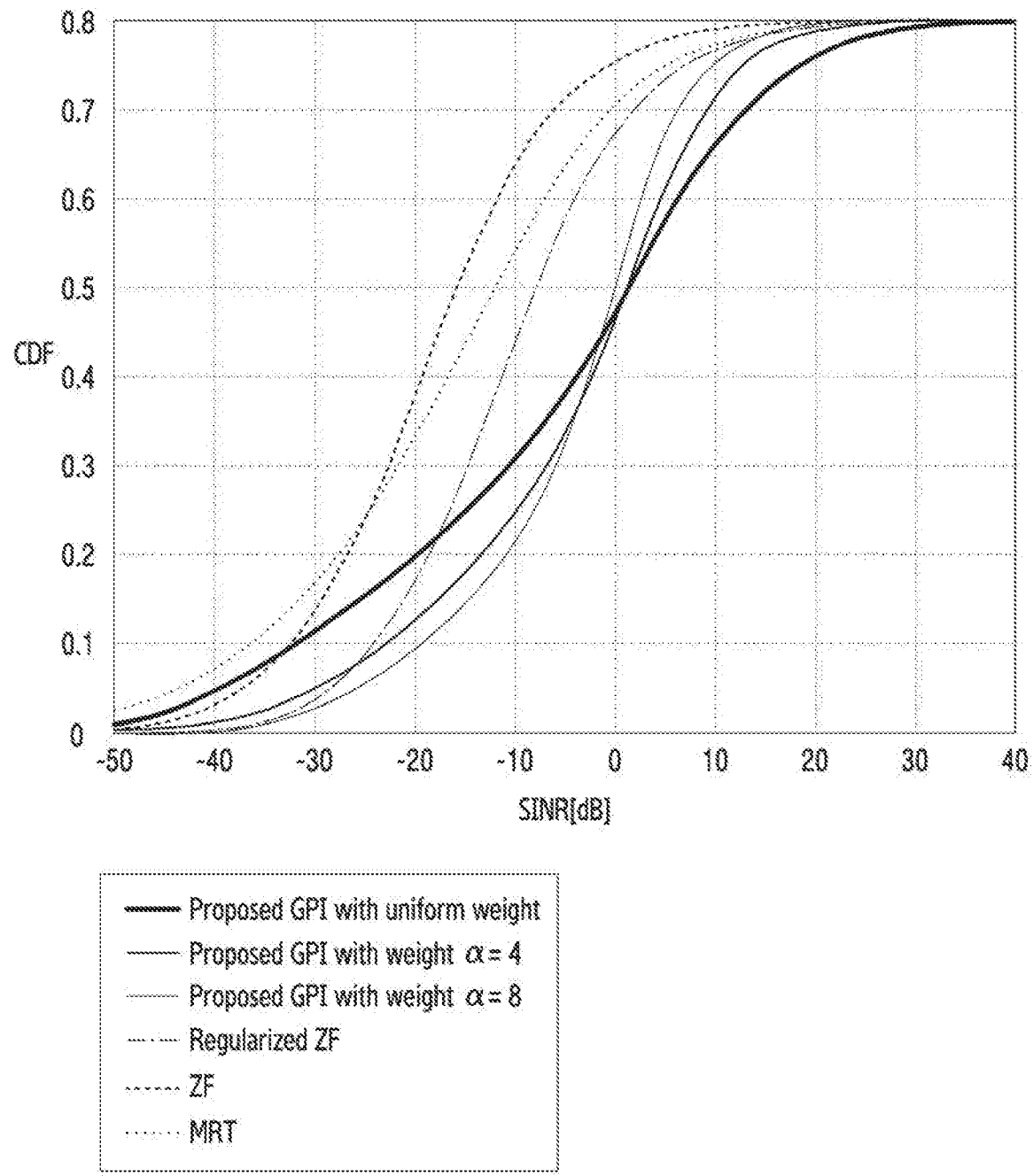
FIG. 14 illustrates a graph for comparing performance of integrated beamforming and beamforming of the related art in a wireless communication system according to an embodiment of the disclosure.

FIG. 14 illustrates a graph for comparing performance of integrated beamforming and beamforming of the related art in a wireless communication system according to various embodiments of the disclosure.

Referring to FIG. 14, if the beamforming weight is set to α=0 (uniform weight), performance of low-SINR terminals is degraded over regularized ZF (RZF). By contrast, if a is increased for the terminal fairness, the performance of the low-SINR terminals may be enhanced.

Figure 15:
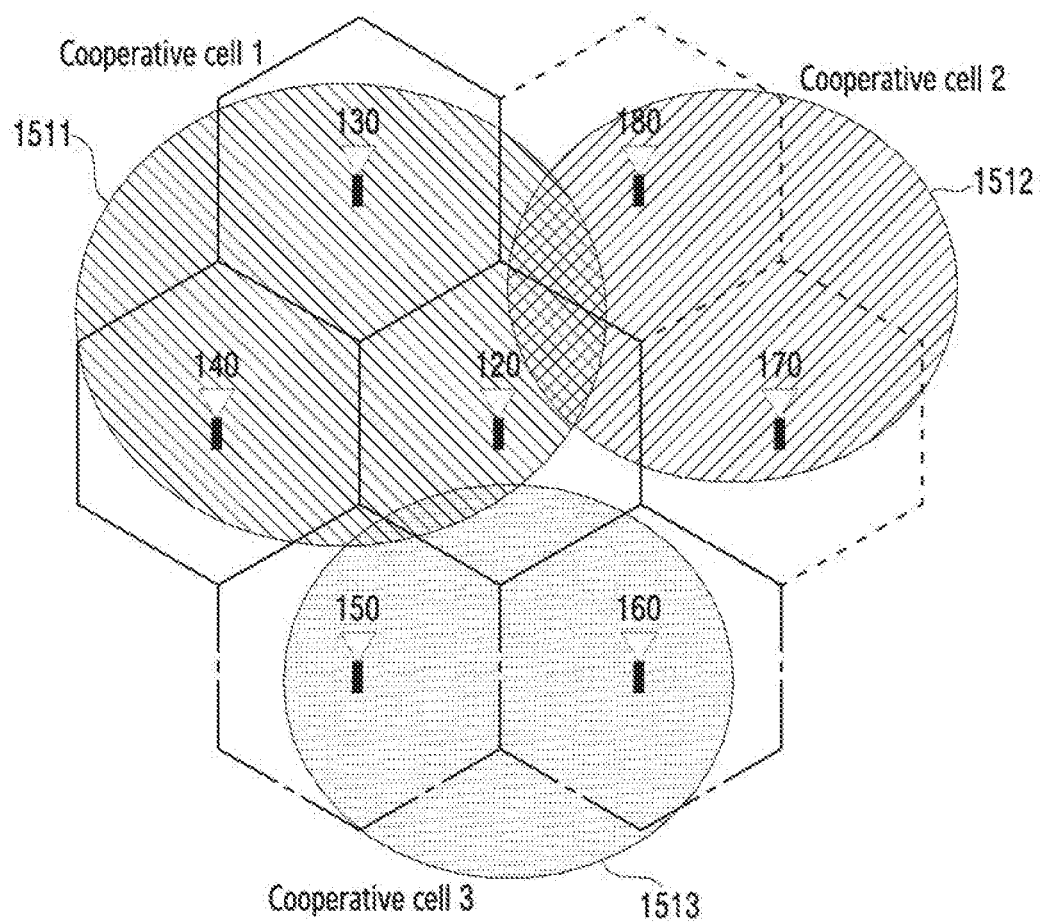
FIG. 15 illustrates multi-cell coordination in a wireless communication system according to an embodiment of the disclosure.

FIG. 15 illustrates multi-cell coordination in a wireless communication system according to various embodiments of the disclosure.

Referring to FIG. 15, the multi-cell coordination may include a case where global CSI of in-cell terminals 120 through 180 is shared between coordinated cells 1511, 1512, and 1513, or a case where a base station knows an interference signal from other cell. Accordingly, the cells each need to know channels of the terminals. For example, the global CSI may be estimated from CSI-IM. The disclosure may provide the coordinated beamforming which requires merely sharing of inter-cell channel information and requires no sharing of transmit data. Compared to the single-cell operation (e.g., FIG. 8), the multi-cell coordination differs in that the base station conducts centralized beamforming with the global CSI.

Figure 16:
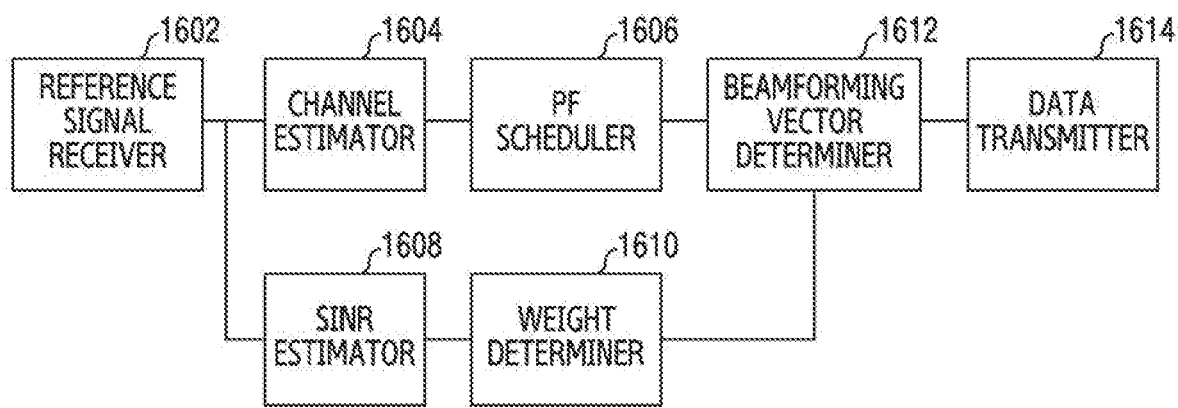
FIG. 16 illustrates a block diagram of operations of a base station in a wireless communication system according to an embodiment of the disclosure.

FIG. 16 illustrates a block diagram of operations of a base station for multi-cell coordination in a wireless communication system according to various embodiments of the disclosure.

Referring to FIG. 16, the base station includes a reference signal receiver 1602, a channel estimator 1604, a PF scheduler 1606, an SINR estimator 1608, a weight determiner 1610, a beamforming vector determiner 1612, and a data transmitter 1614.

The reference signal receiver 1602 may receive an uplink reference signal from the terminal 120, and further receive CSI-RS and CSI-IM from neighboring cells. The channel estimator 1604 estimates a channel based on the received reference signals and CSI-RS. For example, if the TDD scheme is applied, the base station may obtain CSI of the terminals, by receiving the SRS from each in-cell terminal. If a frequency division duplex (FDD) scheme is applied, the base station may acquire the CSI of each terminal, by transmitting the CSI-RS to the in-cell terminals to estimate a downlink channel and receiving the CSI from each terminal. The PF scheduler 1606 determines scheduling metrics to allocate resources based on the estimated channel state while satisfying the fairness of the terminals. The SINR estimator 1608 estimates the SINR for each in-cell terminal. The weight determiner 1610 determines a weight per terminal based on the estimated SINR and the determined scheduling metrics. The beamforming vector determiner 1612 determines beamforming vectors in conjunction with the terminal selection and the power allocation based on the estimated channel information, the CSI-IM, and the weight per terminal. The data transmitter 1614 transmits downlink data to each terminal. In so doing, the data transmitter 1614 may beamform transmit signals using the beamforming vectors determined by the beamforming vector determiner 1612.

Figure 17:
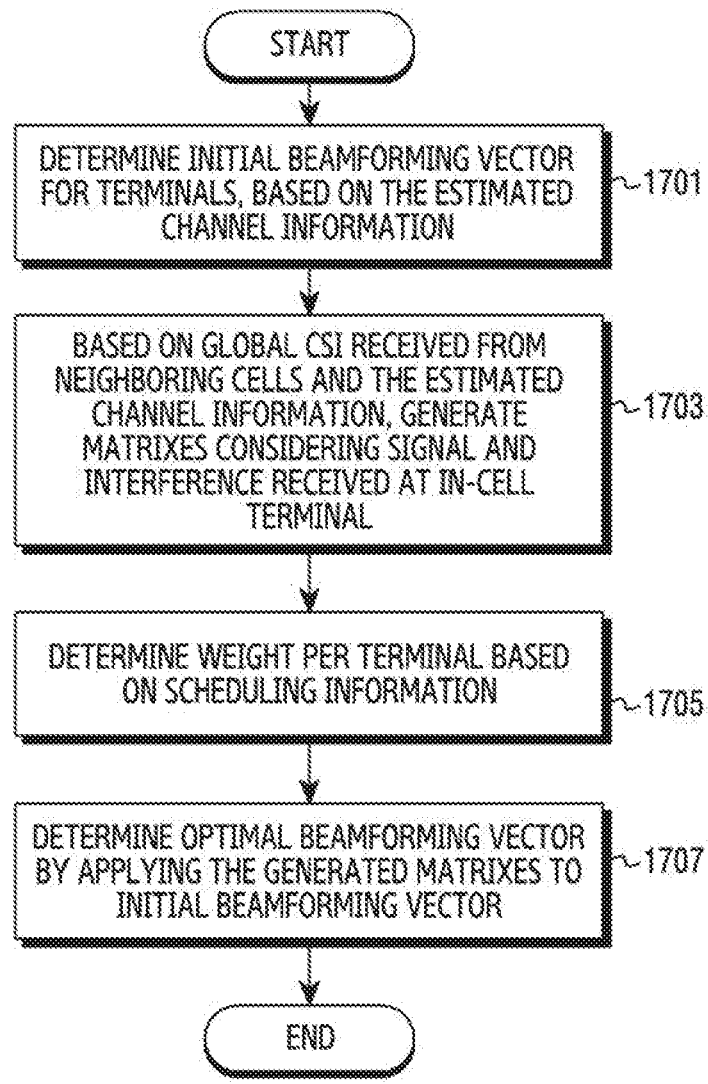
FIG. 17 illustrates a flowchart of a method for determining a beamforming vector of a base station for multi-cell coordination in a wireless communication system according to various embodiments of the disclosure.

FIG. 17 illustrates a flowchart of a method for determining a beamforming vector of a base station for multi-cell coordination in a wireless communication system according to various embodiments of the disclosure.

Referring to FIG. 17, in operation 1701, the base station determines an initial beamforming vector for each terminal, based on channel information estimated. Herein, the initial beamforming vector may be determined based on channel information estimated for each terminal in the base station. For example, the initial beamforming vector may be determined by the MRT scheme, the MMSE scheme, the ZF scheme, or other known scheme.

In operation 1703, based on global channel information received from neighboring cells and the estimated channel information, the base station generates matrixes in consideration of a signal and interference received at each in-cell terminal. Herein, the global channel information may include global CSI. The global CSI may include channel information between all the terminals and interference information received from other cells. The global CSI may be acquired through CSI-IM. For example, each base station may transmit CSI-IM to their terminals, and receive global CSI fed back from the terminals receiving the CSI-IM. The matrixes generated by considering the signal and the interference received at each in-cell terminal may include a first matrix indicating channel information and interference information of each in-cell terminal, and a second matrix which excludes channel information of a particular terminal alone from the first matrix. As in the single-cell operation, channel error information may be considered to generate the matrixes.

In operation 1705, the base station determines a weight per terminal based on scheduling information. For example, the scheduling information may be a scheduling metric determined based on the PF scheduling scheme. Based on the scheduling information, the base station may determine the weights by, for example, using the scheduling metric as the weight or applying a predefined calculation to the scheduling matrix.

In operation 1707, the base station may determine an optimal beamforming vector by applying the generated matrixes and the weight per terminal to the initial beamforming vector. For example, the base station may generate a third matrix by applying the first matrix and the weight per terminal to the initial beamforming vector, and a fourth matrix by applying the second matrix and the weight per terminal to the initial beamforming vector. Herein, the third matrix and the fourth matrix rely on the beamforming vectors. The base station may determine other beamforming vectors, based on an inverse of the fourth matrix and the third matrix. In so doing, the base station may normalize the determined beamforming vector. The base station may determine whether the determined beamforming vectors converge, repeat the above-stated process on the other beamforming vectors determined, and thus determine, that is, update other beamforming vector. Through such iterations, the base station may determine the optimal beamforming vector. For example, whether the determined beamforming vectors converge may be determined by whether a difference between a previously determined beamforming vector (a first beamforming vector determined) and a currently determined beamforming vector (a second beamforming vector determined) falls below a specific threshold or whether the iterations are conducted for a preset number of times. Determining the optimal beamforming vector may utilize the GPI algorithm.

As above, the beamforming vectors for the terminals in the multi-cell coordination may be determined. Now, specific operations of the base station for determining beamforming vector are described with equations and FIG. 18.

Figure 18:
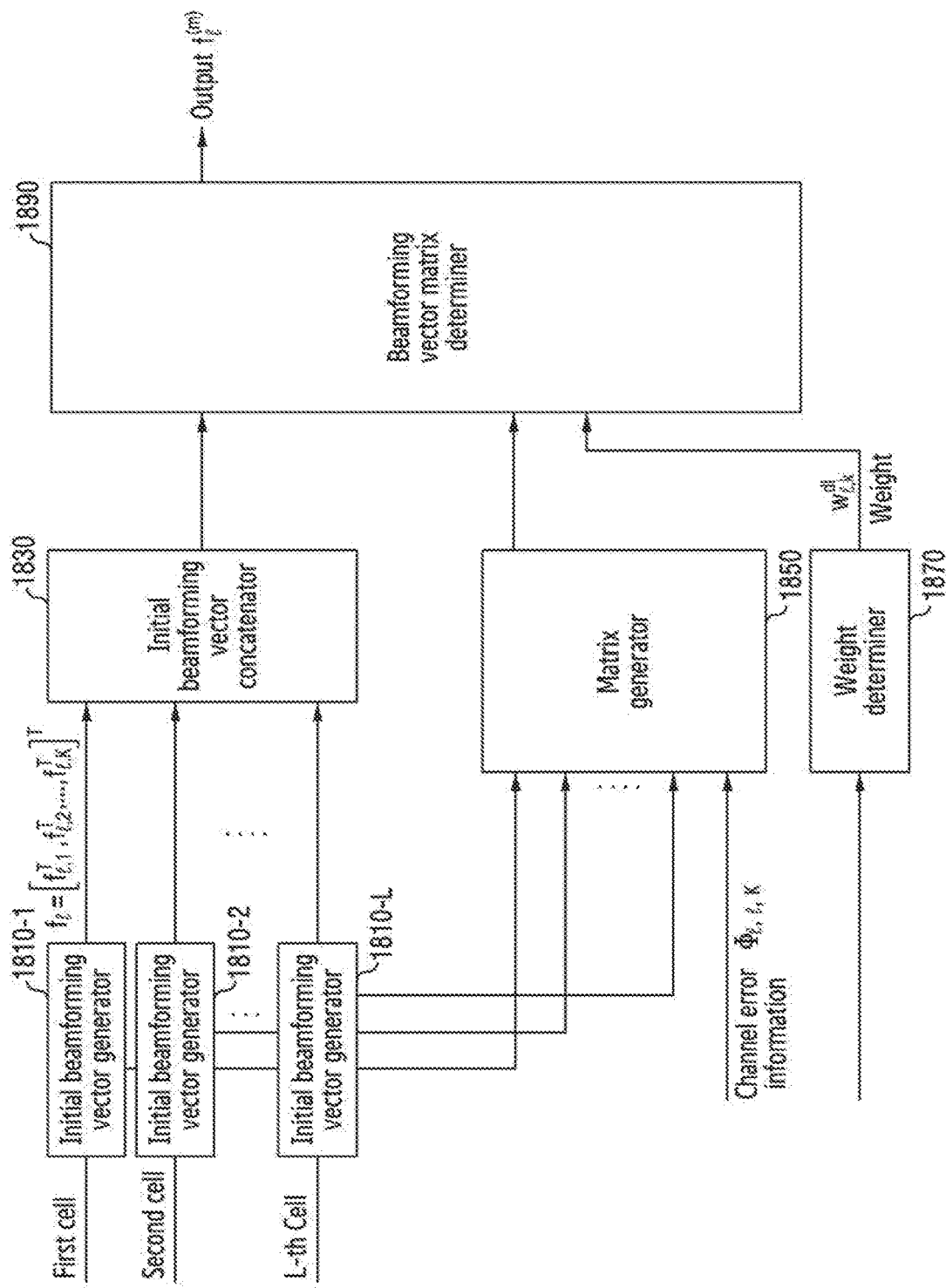
FIG. 18 illustrates a block diagram of operations of a beamforming vector determiner of a base station for multi-cell coordination in a wireless communication system according to various embodiments of the disclosure.

FIG. 18 illustrates a block diagram of operations of a beamforming vector determiner of a base station for multi-cell coordination in a wireless communication system according to various embodiments of the disclosure. FIG. 18 represents the configuration of the beamforming vector determiner 1612 with the functional blocks.

Referring to FIG. 18, the beamforming vector determiner 1612 includes initial beamforming vector generators 1810-1 through 1810-L, an initial beamforming vector concatenator 1830, a matrix generator 1850, a weight determiner 1870, and a beamforming vector matrix determiner 1890.

The initial beamforming vector generators 1810-1 through 1810-L generate an initial beamforming vector for each terminal based on channel estimation information for each terminal. For global channel estimation of the base station, the terminals may transmit, for example, SRS or CSI-RS and CSI-IM to the base station. The base station may obtain imperfect channel information of out-of-cell terminals as well as the in-cell terminals.

For example, in the multi-cell coordination, provided that L-ary base station each include K-ary terminals, a receive signal of the k-th terminal in the l-th base station is given by Equation 15.

$$y_{l,k} = \sqrt{\beta_{l,l,k}} \hat{h}_{l,l,k}^H f_{l,k} s_{l,k} + \sum_{i \neq k}^{K} \sqrt{\beta_{l,l,k}} \hat{h}_{l,l,k}^H f_{l,i} s_{l,i} + \sum_{j \neq l}^{K} \sqrt{\beta_{j,l,k}} \sum_{i=1}^{K} h_{j,l,k}^H f_{j,i} s_{j,i} + \tilde{n}_{l,k}$$

Equation 15

In Equation 15, $y_{l,k}$ denotes the received signal of the k-th terminal in the l-th base station, $\beta_{l,l,k}$ denotes the path loss between the l-th base station and the k-th terminal of the l-th base station, $\hat{h}_{l,l,k}^H$ denotes the imperfect channel between the l-th base station and the k-th terminal of the l-th base station, $f_{l,k}$ denotes the beamforming vector transmitted by the l-th base station to the k-th terminal, $s_{l,k}$ denotes the symbol transmitted from the l-th base station to the k-th in-cell terminal, $f_{l,i}$ denotes the beamforming vector transmitted from the l-th base station to the i-th terminal, $s_{l,i}$ denotes the symbol transmitted from the l-th base station to the i-th in-cell terminal, $h_{j,l,k}^H$ denotes a perfect channel between the j-th base station and the k-th terminal of the l-th base station, $f_{j,i}$ denotes the beamforming vector transmitted by the j-th base station to the i-th terminal, $s_{j,i}$ denotes the symbol transmitted from the j-th base station to the i-th terminal, and $\sqrt{\beta_{j,l,k}} \hat{h}_{j,l,k}^H$ denotes a channel between the j-th base station and the k-th terminal of the l-th base station. $\sqrt{\beta_{l,l,k}} \hat{h}_{l,l,k}^H f_{l,k} s_{l,k}$ denotes a desired signal to be received from the base station at the k-th particular terminal, and $\Sigma_{i \neq k}^{K} \sqrt{\beta_{l,l,k}} \hat{h}_{l,l,k}^H f_{l,i} s_{l,i}$ denotes interferences between the terminals in the base station. $\Sigma_{j \neq l}^{K} \sqrt{\beta_{j,l,k}} \Sigma_{i=1}^{K} h_{j,l,k}^H f_{j,i} s_{j,i}$ denotes intra-cluster interference from the coordinated cell, and $\tilde{n}_{l,k}$ denotes thermal noise of out-of-cluster interference (interference from other cells than the coordinated cell) and the base station. As in the single-cell operation, the SINR for the in-cell terminals may be calculated based on Equation 15 in the multi-cell coordination. Hence, the maximization of the weighted sum spectral efficiency is subject to the optimization problem solution of Equation 16.

$$\underset{f}{\text{maximize}} \prod_{l=1}^{L} \prod_{k=1}^{K} \left[ \frac{f^H \left( A_{l,k} + \frac{\sigma_{l,k}^2}{P \beta_{l,l,k}} I \right) f}{f^H \left( B_{l,k} + \frac{\sigma_{l,k}^2}{P \beta_{l,l,k}} I \right) f} \right]^{w_{l,k}}$$

Equation 16 subject to $\sum_{k=1}^{K} \|f_{l,k}\|_2^2 \leq 1$ for $1 \in \{1, \ldots, L\}$

Equation 16 has the form of Equation 8 of the single-cell operation. Accordingly, the algorithm of Table 1 as in the single-cell operation may be applied equivalently, and a sub-optimal beamforming vector may be calculated.

If, for example, there are K-ary terminals in each cell, the initial beamforming vector generators 1810-1 through 1810-L generate K-ary beamforming vectors for channel estimation information of the K-ary terminals. Next, the initial beamforming vector concatenator 1830 may gather channel information received from neighboring cells, and concatenate the K-ary beamforming vectors into $f_l = [f_{l,1}^T, f_{l,2}^T, \ldots, f_{l,K}^T]^T$ through the serial-parallel conversion. In so doing, the initial beamforming vector concatenator 1830 may concatenate the concatenated vectors of each base station into a single vector form through the serial-parallel conversion.

The matrix generator 1850 generates matrixes considering a signal and interference received at each in-cell terminal based on the channel estimation information and channel error information of each terminal. Herein, the channel error information may indicate, as described above, the difference of the imperfect channel and the perfect channel due to the out-of-cell interference and the intra-cell interference. Such channel error information may be expressed with the channel error covariance matrix based on Equation 5. The matrixes considering the signal and the interference received at each in-cell terminal may include $A_{l,k}$ (the first matrix) and $B_{l,k}$ (the second matrix). $A_{l,k}$ may be given by $$A_{l,k} = \begin{bmatrix} \hat{h}_{l,k} \hat{h}_{l,k}^H + \Phi_{l,1} & 0 & 0 & \cdots & 0 \\ \vdots & \ddots & \vdots & \ddots & \vdots \\ 0 & \vdots & \hat{h}_{l,k} \hat{h}_{l,k}^H + \Phi_{l,k} & \cdots & 0 \\ \vdots & \vdots & \vdots & \ddots & \vdots \\ 0 & 0 & 0 & \cdots & \hat{h}_{l,k} \hat{h}_{l,k}^H + \Phi_{l,K} \end{bmatrix} + \frac{\hat{\sigma}_{l,k}^2}{P} I_{NK},$$

and $B_{l,k}$ may be given by $$B_{l,k} = A_{l,k} - \begin{bmatrix} 0 & 0 & 0 & \cdots & 0 \\ \vdots & \vdots & \vdots & \ddots & \vdots \\ 0 & \cdots & \hat{h}_{l,k} \hat{h}_{l,k}^H & \cdots & 0 \\ \vdots & \vdots & \vdots & \ddots & \vdots \\ 0 & 0 & 0 & \cdots & 0 \end{bmatrix}.$$

$A_{l,k}$ and $B_{l,k}$ may be generated per base station, the generated $A_{l,k}$ may be added up to produce $$A_{l,k} = \begin{bmatrix} A_{1,l,k} & 0 & 0 & 0 & \cdots & 0 \\ \vdots & \vdots & \vdots & \vdots & \ddots & \vdots \\ 0 & 0 & A_{l,l,k} & 0 & \cdots & 0 \\ \vdots & \vdots & \vdots & \vdots & \ddots & \vdots \\ 0 & 0 & 0 & 0 & \cdots & A_{L,l,k} \end{bmatrix} \text{ (a fifth matrix),}$$

and the generated $B_{l,k}$ may be added up to produce $$B_{l,k} = \begin{bmatrix} B_{1,l,k} & 0 & 0 & 0 & \cdots & 0 \\ \vdots & \vdots & \vdots & \vdots & \ddots & \vdots \\ 0 & 0 & B_{l,l,k} & 0 & \cdots & 0 \\ \vdots & \vdots & \vdots & \vdots & \ddots & \vdots \\ 0 & 0 & 0 & 0 & \cdots & B_{L,l,k} \end{bmatrix} \text{ (a sixth matrix).}$$

The weight determiner 1870 determines the weight per terminal based on the scheduling information. Herein, the scheduling information includes scheduling information according to the PF scheduling scheme. As mentioned earlier, in FIG. 6, if the PF scheduler determines the scheduling metrics to satisfy the fairness of the terminals and to achieve the resource allocation based on the estimated channel state, the weight determiner 1870 may determine the weight from the scheduling metrics. The weight per terminal is expressed as $w_{l,k}$ of Equation 6, and is used to determine the matrix indicative of the optimal beamforming vector.

The beamforming vector matrix determiner 1890 determines the optimal beamforming vector by considering the generated matrixes and the weight per terminal to the initial beamforming vector. As in the single-cell operation, the optimal beamforming vector may be calculated through the algorithm of Table 1.

Figure 19:
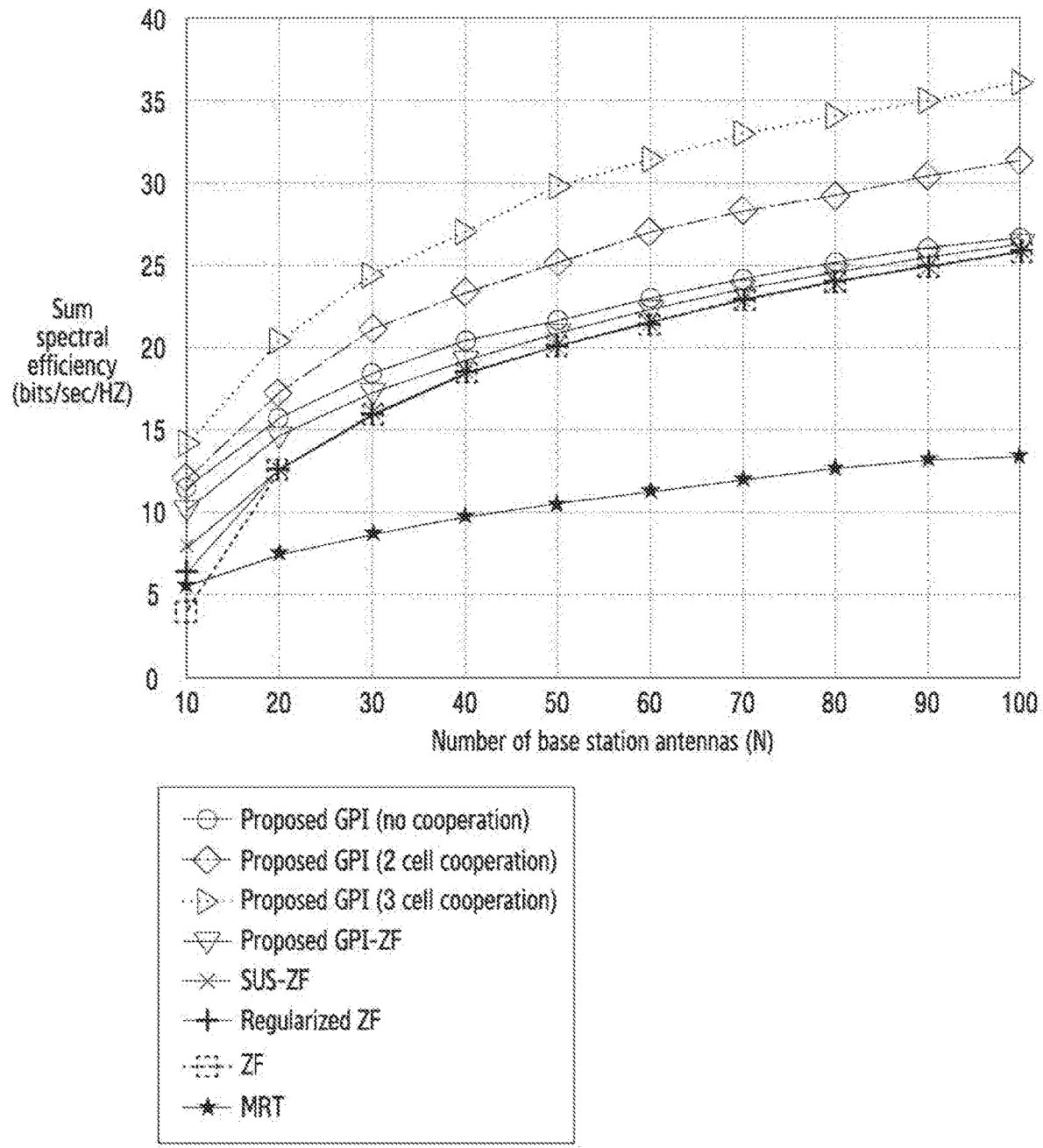
FIG. 19 illustrates a graph for comparing performance of integrated beamforming and beamforming of the related art based on a number of base station antennas for multi-cell coordination in a wireless communication system according to an embodiment of the disclosure.

FIG. 19 illustrates a graph for comparing performance of integrated beamforming and beamforming of the related art based on the number of base station antennas for multi-cell coordination in a wireless communication system according to various embodiments of the disclosure.

Figure 20:
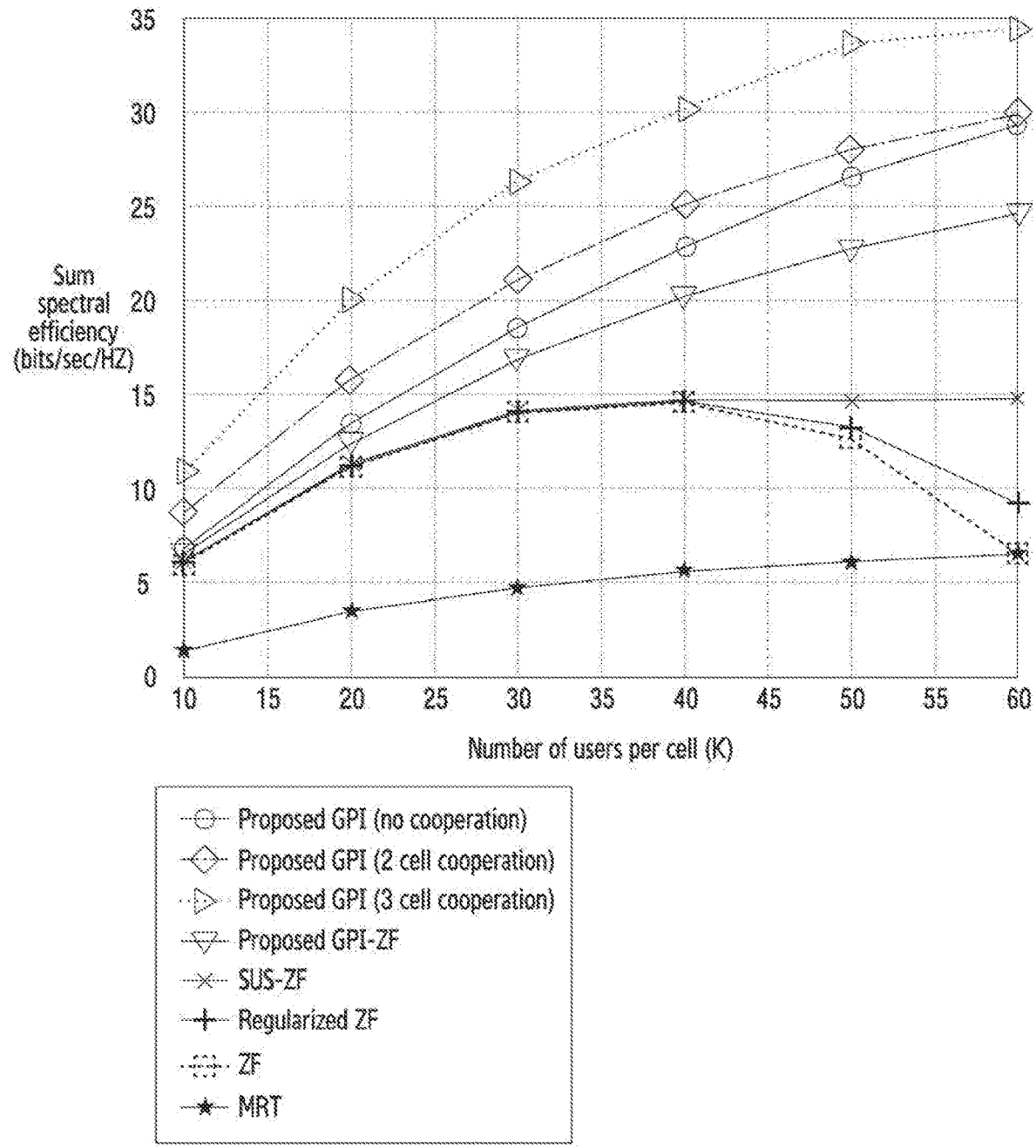
FIG. 20 illustrates a graph for comparing performance of integrated beamforming and beamforming of the related art based on a number of in-cell users for multi-cell coordination in a wireless communication system according to an embodiment of the disclosure.

FIG. 20 illustrates a graph for comparing performance of integrated beamforming and beamforming of the related art based on the number of in-cell users for multi-cell coordination in a wireless communication system according to various embodiments of the disclosure.

Referring to FIGS. 19 and 20, a simulation environment sets a distance between base stations to 1000 m, a base station transmit power to 40 dBm, a transmit frequency to 2 GHz, and a bandwidth to 20 MHz. The channel model adopts the exponential correlation model, and the path loss model adopts the Okumura-Hata model. At this time, a shadowing standard variation is 8 dB. The beamforming vector $f_{l,k}$ is designed by the algorithm of Table 1 based on the imperfect channel information. FIG. 19 shows the sum spectral efficiency based on the number of the base station antennas, assuming that the number of users per cell is 10. FIG. 20 shows the sum spectral efficiency based on the number of the in-cell users, with 64 base station antennas. As shown in FIGS. 19 and 20, the scheduling and power allocation integrated beamforming achieves the improved sum spectral efficiency over the ZF of the related art and MRT and the ZF considering the scheduling.

The multi-cell coordination described in FIG. 15 designs the centralized beamforming on the assumption that the multi-cell coordination is fulfilled by sharing the channel information of the terminals between the base stations. However, the actual wireless communication system incurs considerable indirect costs for such an assumption. Thus, a method for designing the beamforming in a situation where only the limited coordination is feasible between the base stations is suggested. Herein, the limited coordination indicates that each base station does not share the CSI of all users of other cells but may obtain local CSI of some terminals of a neighboring cell.

Figure 21A:
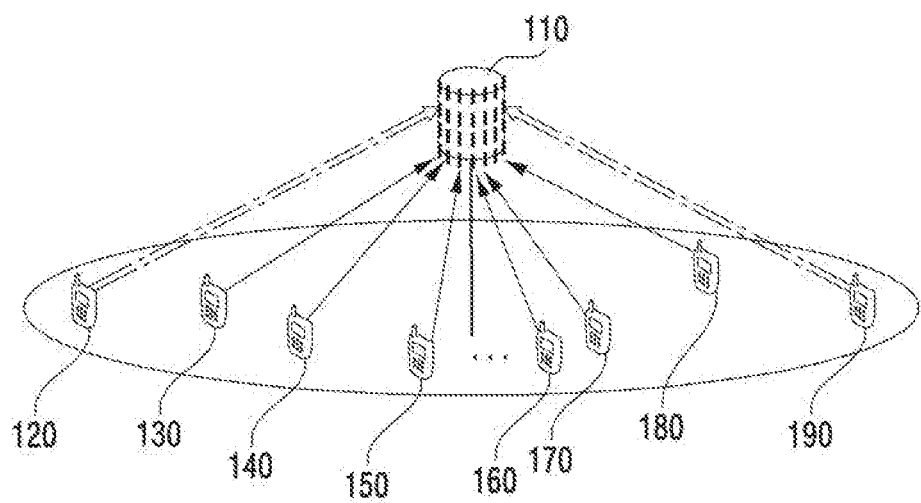
FIG. 21A illustrates limited multi-cell coordination in a wireless communication system according to an embodiment of the disclosure.
Figure 21B:
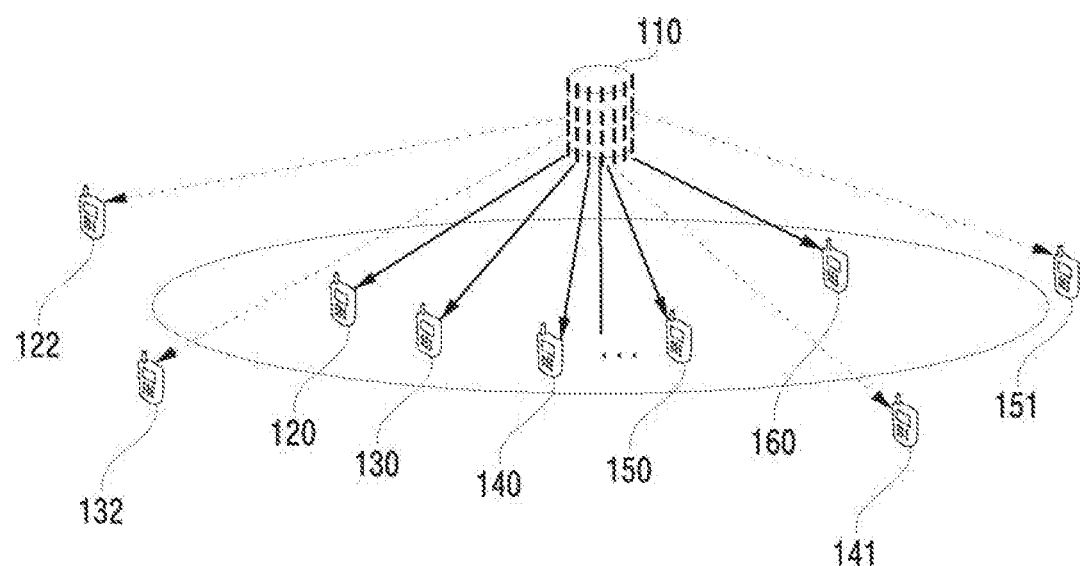
FIG. 21B illustrates a limited multi-cell coordination in the wireless communication system according to an embodiment of the disclosure.

FIG. 21A illustrates limited multi-cell coordination in a wireless communication system according to various embodiments of the disclosure. FIG. 21B illustrates the limited multi-cell coordination in the wireless communication system according to various embodiments of the disclosure.

FIG. 21A depicts that a base station 110 may obtain local CSI from some neighboring cell terminals 120 and 190.

Referring to FIG. 21A, the base station 110 receives uplink pilots from in-cell terminals 130 through 180 and some terminals 120 and 190 of a neighboring cell. In so doing, it is assumed that the base station 110 knows pilot configuration information of the neighboring cell terminals, and the neighboring cell terminals 120 and 190 may use an uplink pilot signal which is orthogonal to the in-cell terminals 130 through 180. The base station 110, which also receives the pilot signals from the neighboring cell terminals 120 and 190, may estimate the local CSI of the neighboring cell terminals 120 and 190 which use the orthogonal pilot signal. Besides, the base station 110 may obtain channel information of the neighboring cell terminals 120 and 190 by using CSI-IM.

FIG. 21B depicts that the base station 110 performs downlink transmission to the in-cell terminals 120 through 160 and neighboring cell terminals 122, 132, 141, and 151, indicating leakage on the neighboring cell due to the downlink transmission of the base station 110. Herein, each base station may not control interference signals from other cells. Meanwhile, the base station may control leakage between the in-cell terminals of the base station 110 and leakage on other cells due to the downlink transmission of the base station 110.

In the following, a beamforming method for considering the SINR of the terminal and the leakage on the other cells due to the downlink transmission of the base station and for maximizing the weighted sum spectral efficiency in the limited multi-cell coordination is suggested.

Figure 22:
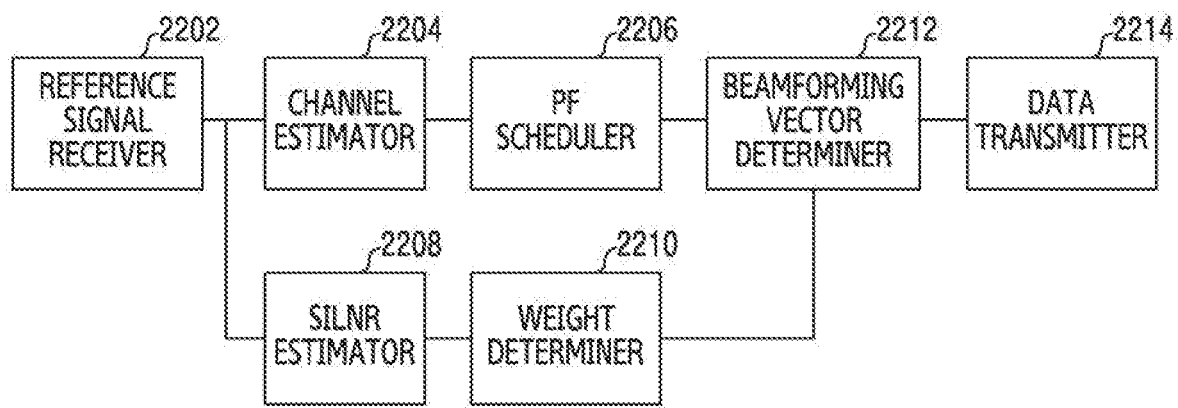
FIG. 22 illustrates a block diagram of operations of a base station for limited multi-cell coordination in a wireless communication system according to an embodiment of the disclosure.

FIG. 22 illustrates a block diagram of operations of a base station for limited multi-cell coordination in a wireless communication system according to various embodiments of the disclosure.

Referring to FIG. 22, the base station includes a reference signal receiver 2202, a channel estimator 2204, a PF scheduler 2206, a signal-to-interference-plus-leakage-and-noise ratio (SILNR) estimator 2208, a weight determiner 2210, a beamforming vector determiner 2212, and a data transmitter 2214.

The reference signal receiver 2202 may receive an uplink reference signal from the terminal, and further receive CSI-RS and CSI-IM from neighboring cells. The channel estimator 2204 estimates a channel based on the received reference signals and CSI-RS. For example, if the TDD scheme is adopted, the base station may obtain CSI of the terminals, by receiving the SRS from in-cell terminals. If the FDD scheme is adopted, the base station may acquire the CSI of each terminal, by transmitting CSI-RS to the in-cell terminals to estimate a downlink channel and receiving CSI from each terminal. The PF scheduler 2206 determines scheduling metrics to allocate resources based on the estimated channel state while satisfying the fairness of the terminals. The SILNR estimator 2208 estimates SILNR for each in-cell terminal. The weight determiner 2210 determines a weight per terminal based on the estimated SILNR and the determined scheduling metrics. The beamforming vector determiner 2212 determines beamforming vectors in conjunction with the terminal selection and the power allocation based on the estimated channel information, the CSI-IM, and the weight per terminal. The data transmitter 2214 transmits downlink data to each terminal. In so doing, the data transmitter 2214 may beamforming transmit signals using the beamforming vectors determined by the beamforming vector determiner 2212.

Figure 23:
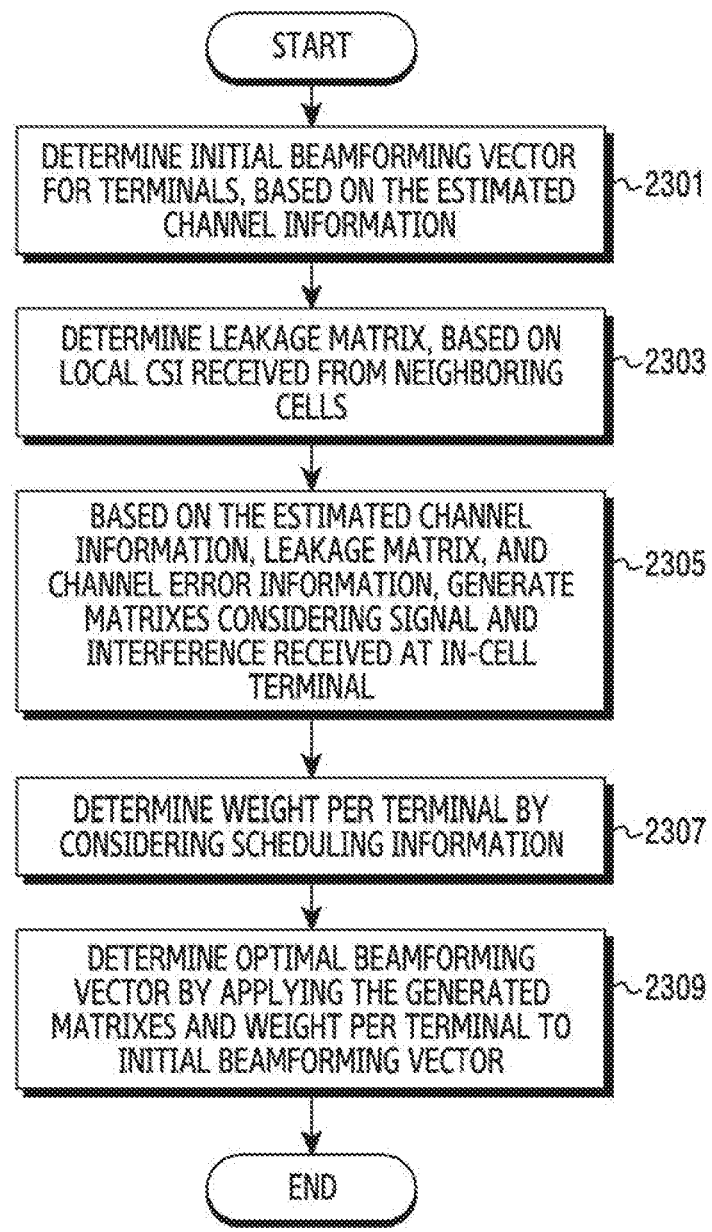
FIG. 23 illustrates a flowchart of a method for determining a beamforming vector of a base station for limited multi-cell coordination in a wireless communication system according to an embodiment of the disclosure.

FIG. 23 illustrates a flowchart of a method for determining a beamforming vector of a base station for limited multi-cell coordination in a wireless communication system according to various embodiments of the disclosure.

Referring to FIG. 23, in operation 2301, the base station determines an initial beamforming vector for each terminal based on channel information estimated. Herein, the initial beamforming vector may be determined based on channel information estimated for each terminal in the base station.

For example, the initial beamforming vector may be determined by the MRT scheme, the MMSE scheme, the ZF, or other known scheme.

In operation 2303, the base station determines a leakage matrix, based on the local CSI received from the neighboring cells. Herein, the leakage matrix indicates the leakage affected by downlink transmission of the base station on the neighboring cell. For example, since the base station receives pilot signals from the terminals of the neighboring cell, the base station may estimate the local CSI from the pilot signals of the neighboring cell terminals which are orthogonal to the pilot signals of the in-cell terminals. The base station may determine the leakage matrix based on the estimated local CSI, and utilize the determined leakage matrix to generate matrixes in consideration of the signal and the interference received at each in-cell terminal in operation 2305.

In operation 2305, the base station generates the matrixes in consideration of the signal and the interference received at each in-cell terminal, based on the estimated CSI, the leakage matrix, and channel error information. Herein, the channel error information may be expressed variously according to the channel estimation scheme. In particular, assuming that there is no correlation in the channel per antenna, the channel error information may be represented with a channel error covariance matrix by applying the MMSE channel estimation. The matrixes generated by considering the signal and the interference received at each in-cell terminal may include the first matrix indicating channel information and interference information of each in-cell terminal, and the second matrix which excludes channel information of a particular terminal alone from the first matrix.

In operation 2307, the base station determines a weight per terminal by considering scheduling information. For example, the scheduling information may be a scheduling matrix determined based on the PF scheduling scheme. Based on the scheduling information, the base station may determine the weight, for example, by using the scheduling matrix as the weight or by applying a predefined calculation to the scheduling matrix.

In operation 2309, the base station determines an optimal beamforming vector by applying the generated matrixes and the weight per terminal to the initial beamforming vector. For example, the base station may generate the third matrix by playing the first matrix and the weight per terminal to the initial beamforming vector, and the fourth matrix by applying the second matrix and the weight per terminal to the initial beamforming vector. Herein, the third matrix and the fourth matrix rely on the beamforming vectors. The base station may determine other beamforming vectors, based on an inverse of the fourth matrix and the third matrix. In so doing, the base station may normalize the determined beamforming vector. The base station may determine whether the determined beamforming vectors converge, repeat the above-stated process on the other beamforming vectors detected, and thus determine, that is, update other beamforming vector. Through such iterations, the base station may determine the optimal beamforming vector. For example, whether the determined beamforming vectors converge may be determined by whether a difference between a previously determined beamforming vector (a first beamforming vector determined) and a currently determined beamforming vector (a second beamforming vector determined) falls below a specific threshold or whether the iterations are conducted for a preset number of times.

Figure 24:
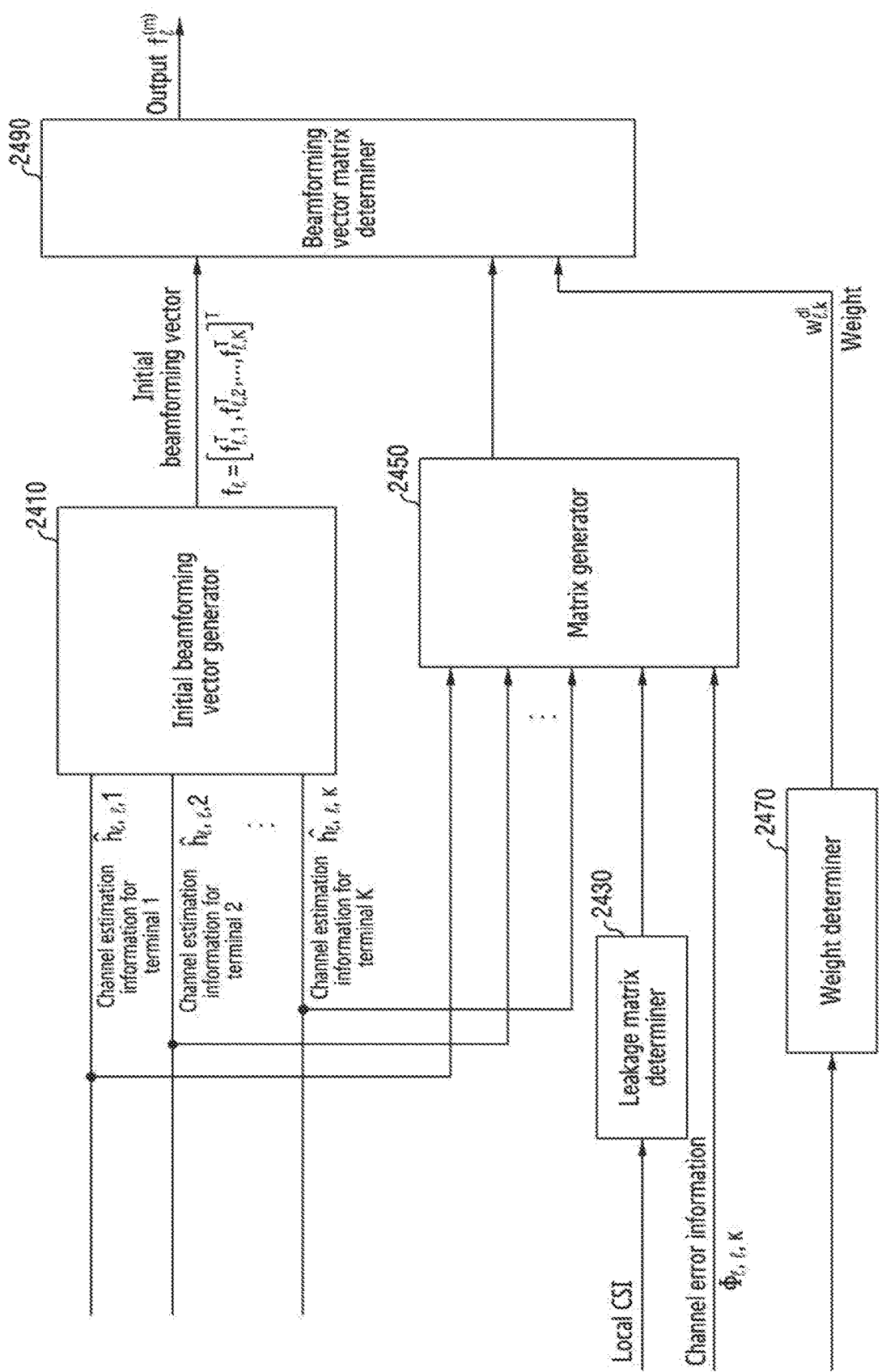
FIG. 24 illustrates a block diagram of operations of a beamforming vector determiner in a base station for limited multi-cell coordination in a wireless communication system according to an embodiment of the disclosure.

Now, specific operations of the base station for determining the beamforming vectors are described with equations and FIG. 24.

FIG. 24 illustrates a block diagram of operations of a base station for determining a beamforming vector for limited multi-cell coordination in a wireless communication system according to various embodiments of the disclosure. FIG. 24 represents the configuration of the beamforming vector determiner 2212 with functional blocks.

Referring to FIG. 24, the beamforming vector determiner 2212 includes an initial beamforming vector generator 2410, a leakage matrix determiner 2430, a matrix generator 2450, a weight determiner 2470, and a beamforming vector matrix determiner 2490.

The initial beamforming vector generator 2410 generates an initial beamforming vector for each terminal based on channel estimation information of the terminal. For example, if there are k-ary in-cell terminals, the initial beamforming vector generator 2410 generates K-ary beamforming vectors for the channel estimation information of the k-ary terminals respectively. Next, for example, the initial beamforming vector generator 2410 may concatenate the K-ary beamforming vectors into $f_l=[f_{l,1}^T, f_{l,2}^T, \ldots, f_{l,K}^T]^T$ through the serial-parallel conversion. A reference signal received at the base station from a particular terminal is defined by Equation 3.

The leakage matrix determiner 2430 determines a leakage matrix based on local CSI received from a neighboring cell. Herein, the leakage matrix is determined to leakage estimated by the base station based on local CSI received from the neighboring cell. The leakage matrix may be calculated based on Equation 17.

$$\Sigma_{s_{l,j,i}/K_{l,k}} \hat{h}_{l,j,i} \hat{h}_{l,j,i}^H + \Phi_{l,j,i} \qquad \text{Equation 17}$$

In Equation 17, $\hat{h}_{l,j,i}$ denotes an imperfect channel between the l-th base station and the i-th terminal of the j-th base station, and $\Phi_{l,j,i}$ denotes a channel error covariance matrix between the l-th base station and the i-th terminal of the j-th base station. Based on Equation 17, an SILNR considering all the leakage and noise interference for neighboring cell users is defined as Equation 18.

$$SILNR_{l,k} = \frac{f_{l,k}^H \hat{h}_{l,l,k} \hat{h}_{l,l,k}^H f_{l,k}}{\sum_{i=1}^{K} f_{l,i}^H \Phi_{l,l,k} f_{l,i} + \sum_{i \neq k}^{K} f_{l,i}^H \hat{h}_{l,l,k} \hat{h}_{l,l,k}^H f_{l,i} + Leakage_{l,k} + \frac{\tilde{\sigma}_{l,k}^2}{P}}$$

$$Leakage_{l,k} = f_{l,k}^H \underbrace{\left( \sum_{s_{l,j,i}/K_{l,k}} \hat{h}_{l,j,i} \hat{h}_{l,j,i}^H + \Phi_{l,j,i} \right)}_{L_{l,k}} f_{l,k}$$

Equation 18

In Equation 18, $f_{l,k}$ denotes the beamforming vector transmitted by the l-th base station to the k-th terminal, $\Phi_{l,l,k}$ denotes the covariance matrix for channel error between the l-th base station and the k-th terminal of the l-th base station, $\hat{h}_{l,l,k}^H$ denotes the imperfect channel between the l-th base station and the k-th terminal of the l-th base station, $\hat{h}_{l,j,i}$ denotes the imperfect channel between the l-th base station and the i-th terminal of the j-th base station, $\Phi_{l,j,i}$ denotes the channel error covariance matrix between the l-th base station and the i-th terminal of the j-th base station, P denotes the power of the transmit symbol, and $\tilde{\sigma}_{l,k}^2$ denotes the effective noise signal received at the i-th terminal of the l-th base station. As in Equation 8 derived from Equation 4, Equation 19 for the spectral efficiency maximization may be derived from Equation 18 using the matrix generator 2450 and the weight determiner 2470. Yet, the base station utilizes the local CSI in the channel estimation, and the local CSI is used to calculate the leakage matrix as aforementioned. Since the leakage matrix affects the matrix $A_{l,k}$ (the first matrix) and $B_{l,k}$ (the second matrix), the leakage matrix is considered in determining the beamforming vector.

Equation 19

$$\max \prod_{k=1}^{K} \left[ \frac{\sum_{i=1}^{K} f_{l,i}^{H}(\hat{h}_{l,l,k}\hat{h}_{l,l,k}^{H} + \Phi_{l,l,k})f_{l,i} + f_{l,k}^{H}L_{l,k}f_{l,k} + \frac{\sigma_{k}^{2}}{P}}{\sum_{i \neq k}^{K} f_{l,i}^{H}\hat{h}_{l,l,k}\hat{h}_{l,l,k}^{H}f_{l,i} + \sum_{i=1}^{K} f_{l,i}^{H}\Phi_{l,l,k}f_{l,i} + f_{l,k}^{H}L_{l,k}f_{l,k} + \frac{\tilde{\sigma}_{l,k}^{2}}{P}} \right]^{w_{l,k}}$$

subject to $\sum_{k=1}^{K} \|f_{l,k}\|_{2}^{2} \leq 1$.

In Equation 19, $f_{l,k}$ denotes the beamforming vector transmitted by the l-th base station to the k-th terminal, $\Phi_{l,l,k}$ denotes the covariance matrix for the channel error between the l-th base station and the k-th terminal of the l-th base station, $L_{l,k}$ denotes the leakage matrix for the k-th terminal of the l-th base station, $\hat{h}_{l,l,k}{}^{H}$ denotes the imperfect channel between the l-th base station and the k-th terminal of the l-th base station, $\hat{h}_{l,j,i}{}^{H}$ denotes the imperfect channel between the l-th base station and the k-th terminal of the l-th base station, $\Phi_{l,j,i}{}^{H}$ denotes the channel error covariance matrix between the l-th base station and the i-th terminal of the j-th base station, P denotes the power of the transmit symbol, and $\tilde{\sigma}_{l,k}^{2}$ denotes the effective noise signal received at the i-th terminal of the l-th base station, and $w_{l,k}$ denotes the weight between the l-th base station and the k-th terminal. Since Equation 19 is in the form of the optimization function of the single-cell operation and the multi-cell coordination, the beamforming vector matrix determiner 2490 may apply the algorithm of Table 1. As such, the base station may solve the power allocation and user scheduling integrated beamforming design problem with low complexity, and determine the optimal beamforming vector for each terminal.

Figure 25:
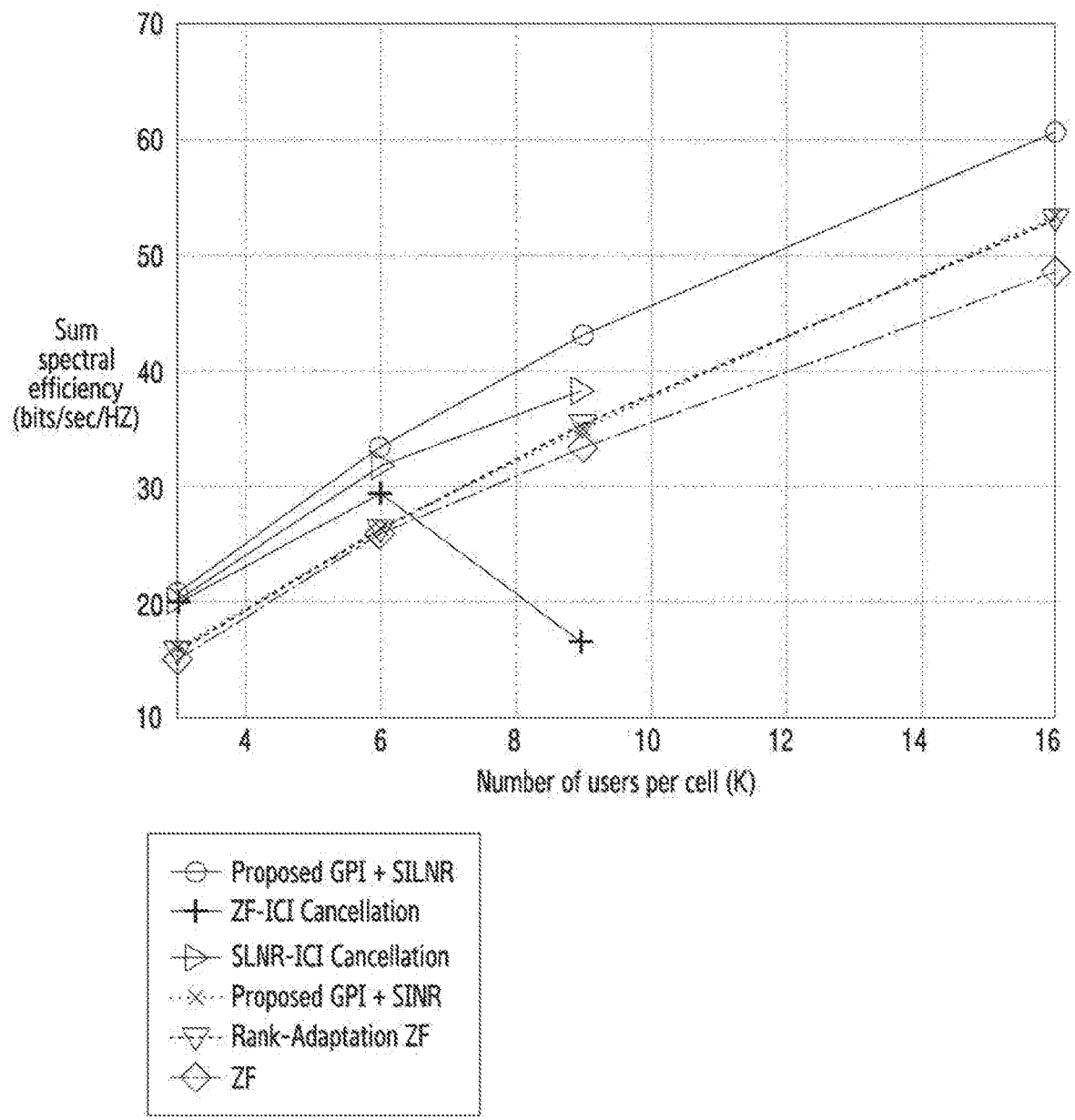
FIG. 25 illustrates a graph for comparing performance of integrated beamforming and beamforming of the related art in consideration of a leakage matrix in a wireless communication system according to an embodiment of the disclosure.

FIG. 25 illustrates a graph for comparing performance of integrated beamforming and beamforming of the related art in consideration of a leakage matrix in a wireless communication system according to various embodiments of the disclosure. FIG. 25 shows the sum spectral efficiency based on the number of in-cell users, assuming that the base station includes 64 antennas. Herein, it is assumed that a pilot reuse factor is set to 7 and base stations know leakage channels to six neighboring base stations.

Referring to FIG. 25, the scheduling and power allocation integrated beamforming achieves the improved sum spectral efficiency over the ZF of the related art and MRT and the ZF considering the scheduling.

An apparatus and a method according to various embodiments of the disclosure may improve the sum spectral efficiency over the beamforming of the related art and enhance the fairness of the users, by jointly considering the power allocation, the user scheduling, and the beamforming in the wireless communication system.

The methods according to the embodiments described in the claims or the specification of the disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the disclosure through an external port. Also, a separate storage device on the communication network may access the apparatus which realizes an embodiment of the disclosure.

In the specific embodiments of the disclosure as described above, the elements included in the disclosure are expressed in a singular or plural form. However, the singular or plural expression is appropriately selected according to a proposed situation for the convenience of explanations, the disclosure is not limited to a single element or a plurality of elements, the elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   obtaining scheduling information, power allocation information, and interference information by estimating a channel for each of a plurality of terminals based on reference signals received from the plurality of the terminals;
   obtaining a beamforming vector matrix for each of the plurality of the terminals based on the scheduling information, the power allocation information, the interference information, and a weight for each of the plurality of the terminals; and
   transmitting data to at least one of the plurality of the terminals using the obtained beamforming vector matrix,
   wherein the weight is identified based on the scheduling information.

2. The method of claim 1, wherein the obtaining of the beamforming vector matrix comprises:
   obtaining an initial beamforming vector based on the estimated channel; and
   obtaining channel error covariance matrixes from channel error information of the plurality of the terminals.

3. The method of claim 2, wherein the obtaining of the beamforming vector matrix comprises:
generating at least one first matrix and at least one second matrix based on the estimated channel and the obtained channel error covariance matrixes.

4. The method of claim 3, wherein the obtaining of the beamforming vector matrix comprises:
identifying the weight for each of the plurality of the terminals based on a scheduling metric identified according to the scheduling information;
generating at least one third matrix by applying the at least one first matrix and the weight to the initial beamforming vector; and
generating at least one fourth matrix by applying the at least one second matrix and the weight to the initial beamforming vector.

5. The method of claim 4, wherein the obtaining of the beamforming vector matrix comprises:
generating an inverse of the at least one fourth matrix; and
obtaining the beamforming vector matrix based on the inverse of the at least one fourth matrix and the at least one third matrix.

6. The method of claim 1, wherein the obtaining of the beamforming vector matrix comprises:
obtaining an initial beamforming vector based on the estimated channel;
obtaining channel error covariance matrixes from channel error information of the plurality of the terminals;
obtaining at least one leakage matrix based on at least one local channel state information (CSI) received; and
generating at least one first matrix and at least one second matrix based on the estimated channel, the obtained channel error covariance matrixes, and the at least one leakage matrix.

7. The method of claim 6, wherein the obtaining of the beamforming vector matrix comprises:
identifying the weight for each of the plurality of the terminals based on a scheduling metric identified according to the scheduling information;
generating at least one third matrix by applying the at least one first matrix and the weight to the initial beamforming vector; and
generating at least one fourth matrix by applying the at least one second matrix and the weight to the initial beamforming vector.

8. The method of claim 7, wherein the obtaining of the beamforming vector matrix comprises:
generating an inverse of the at least one fourth matrix; and
obtaining the beamforming vector matrix based on the inverse of the at least one fourth matrix and the at least one third matrix.

9. An apparatus of a base station in a wireless communication system, the apparatus comprising:
a transceiver; and
at least one processor functionally coupled to the transceiver,
wherein the at least one processor is configured to:
obtain scheduling information, power allocation information, and interference information by estimating a channel for each of a plurality of terminals based on reference signals received from the plurality of the terminals,
obtain a beamforming vector matrix for each of the plurality of the terminals based on the scheduling information, the power allocation information, the interference information, and a weight for each of the plurality of the terminals, and
transmit data to at least one of the plurality of the terminals using the obtained beamforming vector matrix, and
wherein the weight is identified based on the scheduling information.

10. The apparatus of claim 9, wherein, to obtain the beamforming vector matrix, the at least one processor is further configured to:
obtain an initial beamforming vector based on the estimated channel, and
obtain channel error covariance matrixes from channel error information of the plurality of the terminals.

11. The apparatus of claim 10, wherein, to obtain the beamforming vector matrix, the at least one processor is further configured to:
generate at least one first matrix and at least one second matrix based on the estimated channel and the obtained channel error covariance matrixes.

12. The apparatus of claim 11, wherein, to obtain the beamforming vector matrix, the at least one processor is further configured to:
identify the weight for each of the plurality of the terminals based on a scheduling metric identified according to the scheduling information,
generate at least one third matrix by applying the at least one first matrix and the weight to the initial beamforming vector, and
generate at least one fourth matrix by applying the at least one second matrix and the weight to the initial beamforming vector.

13. The apparatus of claim 12, wherein, to obtain the beamforming vector matrix, the at least one processor is further configured to:
generate an inverse of the at least one fourth matrix, and
obtain the beamforming vector matrix based on the inverse of the at least one fourth matrix and the at least one third matrix.

* * * * *